US005541860A

United States Patent [19]

Takei et al.

[11] Patent Number: 5,541,860
[45] Date of Patent: Jul. 30, 1996

[54] SMALL SIZE APPARATUS FOR MEASURING AND RECORDING ACCELERATION

[75] Inventors: Fumio Takei, Isehara; Takafumi Hashitani; Shozo Fujita, both of Atsugi; Koji Asano, Ebina; Hiroaki Suzuki, Sagamihara; Akio Sugama, Atsugi; Naomi Kojima, Ebina, all of Japan

[73] Assignee: Fujitsu Limited, Kawasaki, Japan

[21] Appl. No.: 500,113

[22] Filed: Jul. 10, 1995

Related U.S. Application Data

[63] Continuation of Ser. No. 222,334, Apr. 4, 1994, abandoned, which is a continuation of Ser. No. 829,620, Jan. 31, 1992, abandoned, which is a continuation of Ser. No. 370,173, Jun. 22, 1989, abandoned.

[30] Foreign Application Priority Data

Jun. 22, 1988 [JP] Japan .................................. 63-152251
Jun. 27, 1988 [JP] Japan .................................. 63-156940

[51] Int. Cl.⁶ ........................................................ G01P 15/00
[52] U.S. Cl. ........................... 364/566; 73/489; 73/491; 73/503; 73/510
[58] Field of Search ........................... 364/424.02, 424.06, 364/550, 551.01, 556, 566; 73/489, 491, 492, 503, 510, 517 R; 340/429; 360/5, 6

[56] References Cited

U.S. PATENT DOCUMENTS

| Re. 31,750 | 11/1984 | Morrow ................................... 364/550 |
| 3,284,708 | 11/1966 | Morris et al. ............................. 73/503 |
| 3,781,824 | 12/1973 | Caiati et al. ............................. 360/5 X |
| 4,067,061 | 1/1978 | Juhasz .................................. 364/424.04 |
| 4,114,450 | 9/1978 | Shulman et al. ......................... 364/566 |
| 4,258,430 | 3/1981 | Tyburski ................................. 364/900 |
| 4,258,568 | 3/1981 | Boetes et al. ........................... 73/170.11 |
| 4,361,870 | 11/1982 | D'Agostini et al. ................. 364/424.02 |
| 4,400,783 | 8/1983 | Locke, Jr. et al. ........................ 364/483 |
| 4,409,670 | 10/1983 | Herndon et al. ......................... 360/5 X |
| 4,470,116 | 9/1984 | Ratchford ................................. 360/5 X |
| 4,604,711 | 8/1986 | Benn et al. ........................... 364/424.06 |
| 4,622,640 | 11/1986 | Shimamura et al. .......... 364/464.04 X |
| 4,644,494 | 2/1987 | Muller ..................................... 395/425 |

(List continued on next page.)

FOREIGN PATENT DOCUMENTS

| 0235534 | 9/1987 | European Pat. Off. . |
| 2929532 | 2/1981 | Germany . |
| 3232416 | 3/1984 | Germany . |
| 55-131774 | 10/1980 | Japan . |
| 60-246408 | 12/1985 | Japan . |

OTHER PUBLICATIONS

Electronic Design, vol. 18, No. 1, Jan. 4, 1970, "Workshops in the Sky, Then Factories", by J. N. Kessler, pp. 30–32.
Journal of Crystal Growth, vol. 76, No. 3, Aug. 1986, pp. 681–693, Elsevier Sciences Publ. BV, (North–Holland Physics Publ. Division) Amsterdam, "Preliminary Investigations of Protein Crystal Growth Using the Space Shuttle", by DeLucas et al.

Primary Examiner—James P. Trammell
Assistant Examiner—Kyle J. Choi
Attorney, Agent, or Firm—Staas & Halsey

[57] ABSTRACT

A small size apparatus for measuring and recording acceleration comprises an acceleration sensor, an A/D converter which converts the output signal of the acceleration sensor to a digital signal, a control element which processes the digital signal, a detachable external memory device which stores data of a change in acceleration and, a battery for supplying electric power to the sensor, the A/D converter, the control element and the external memory device. The small size apparatus is mounted on a moving body to be measured and the entire small size apparatus is driven by the battery. The correct attachment of the external memory device is detected by steps of writing data into a special address, reading the data out thereafter, and comparing the written data and read data. When the read data coincides with the written data, it is judged that the external memory device is correctly attached.

23 Claims, 35 Drawing Sheets

U.S. PATENT DOCUMENTS

| | | | |
|---|---|---|---|
| 4,656,585 | 4/1987 | Stephenson | 364/424.06 |
| 4,671,111 | 6/1987 | Lemelson | 364/424.04 X |
| 4,745,564 | 5/1988 | Tennes et al. | 364/550 |
| 4,763,285 | 8/1988 | Moore et al. | 364/551.01 |
| 4,821,218 | 4/1989 | Pötsch | 364/566 |
| 4,853,859 | 8/1989 | Morita et al. | 364/424.04 |
| 4,862,394 | 8/1989 | Thompson et al. | 360/6 X |
| 4,876,502 | 10/1989 | Verbanets et al. | 324/115 |
| 4,908,767 | 3/1990 | Scholl et al. | 364/453 |
| 4,970,648 | 11/1990 | Caputs | 364/424.06 |
| 5,053,967 | 10/1991 | Clavelloux et al. | 364/424.06 |

KC-135

KC-135 AIRCRAFT TRAJECTORY

FILE NO. INCREMENT ROUTINE

FILE NO. DECREMENT ROUTINE

RAM CARD MEMORY MAP

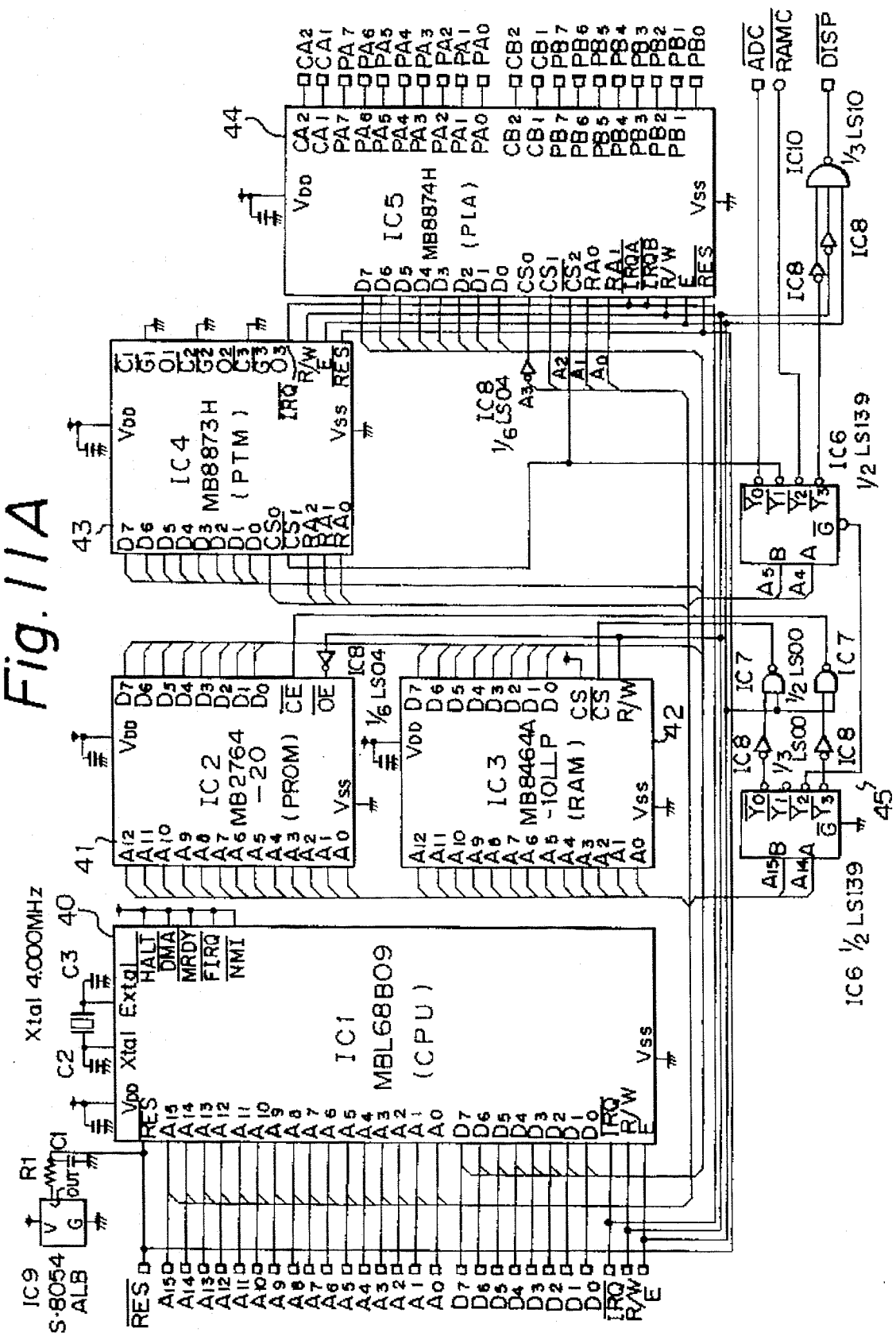

MEMORY MAP

⇒ 512 Byte × 254 BLOCK
(BLOCK NO. &H02~&HFF)

⇒ 256 Byte

⇒ 256 Byte

SAMPLING TIME CODE

1 = 10 ms    4 = 50 ms
2 = 20 ms    5 = 100 ms
3 = 33 ms

UPPER ADDRESS      LOWER ADDRESS

SCALE FACTOR (SIGN)    DATA OF AD CONVERTER (12 bit)
0~15

DISTRIBUTION OF LASTING TIME OF REDUCED GRAVITY

DISTRIBUTION OF MEAN REDUCED GRAVITY

DISTRIBUTION OF REDUCED GRAVITY DATA

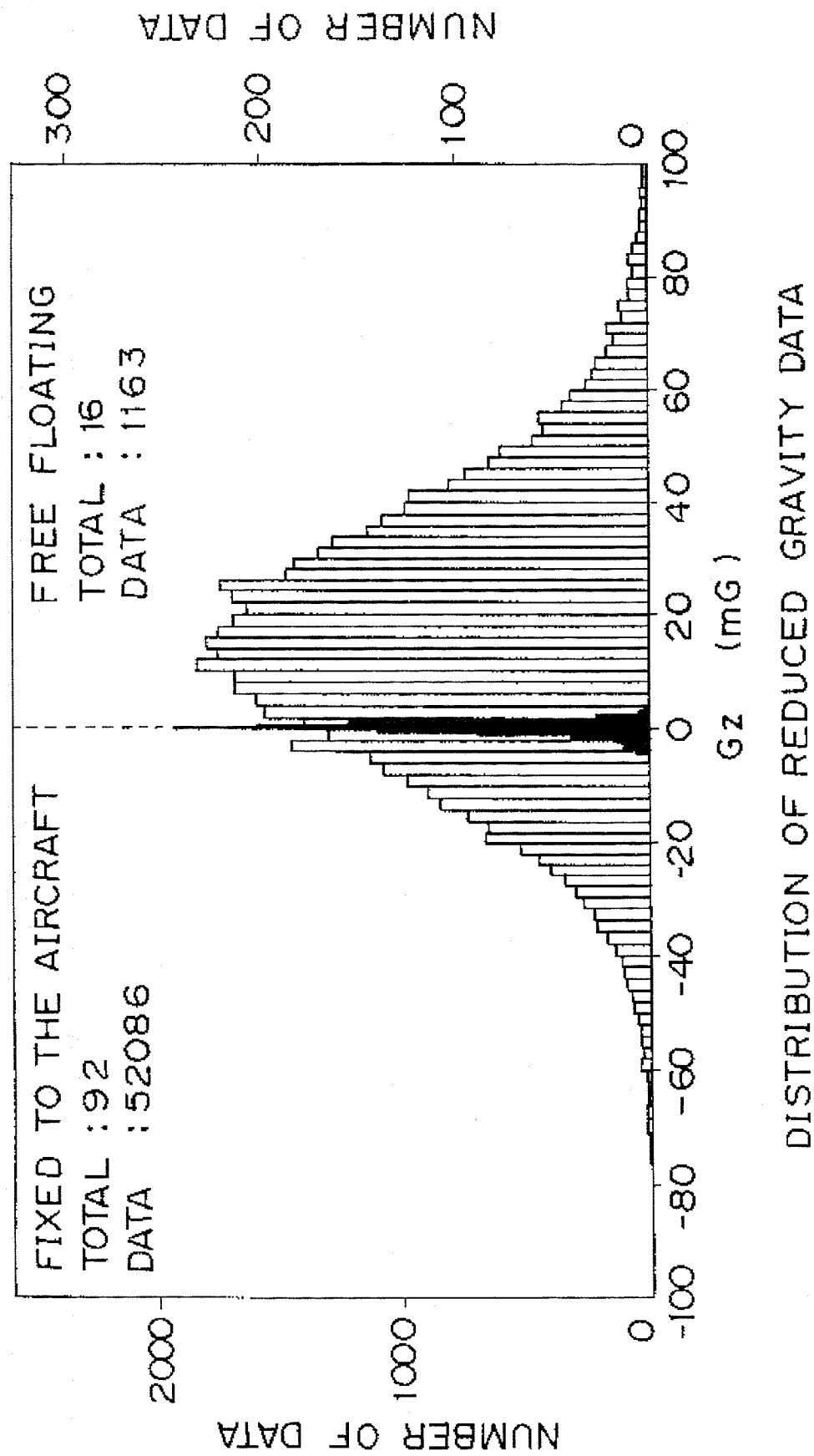

SMALL SIZE APPARATUS FOR MEASURING AND RECORDING ACCELERATION

This application is a continuation of application Ser. No. 08/222,334, filed Apr. 4, 1994, now abandoned, which is a continuation of application Ser. No. 07/829,620, filed Jan. 31, 1992, now abandoned, which is a continuation of application Ser. No. 07/370,173, filed Jun. 22, 1989, abandoned.

BACKGROUND OF THE INVENTION

1. Field of the Invention

The present invention relates to a small size apparatus for measuring and recording acceleration, especially, an apparatus which is suitable for recording fine time changes in acceleration applied to a body. Further, the present invention relates to a memory medium detecting system for detecting a memory medium attached to the small size apparatus for recording the fine time changes in acceleration.

Further, the present invention relates to a method for carrying out a zero gravity experiment by using a space shuttle or a trajectory (or parabolic) flight of an aircraft, wherein the zero gravity experiment system is free floating from the space shuttle or the aircraft.

2. Description of the Related Arts

Recently, a zero gravity environment has been used for the purpose of developing new material. This is because in zero gravity, a physical phenomena which can not be obtained on earth, such as convection of a solution or fusion, or the phenomena in which the deposit of a crystal formed therein can be easily caused so that a novel material can be created. For the provision of a zero gravity environment, an experiment in space using, for example, a space shuttle which is a NASA project, or a first material experimental project (FMPT), are ideal. Zero gravity experiments can also be carried out, using the trajectory of an aircraft, or a short period of zero gravity during free fall of an experimental system in a deep vertical hole.

However, even with the above methods, although the gravity applied to the body is nearly zero, it is usually $1\times10^{-5} \sim 1\times10^{-3}$ G in a vertical free fall experiment, $1\times10^{-6} \sim 1\times10^{-3}$ G in a space (cosmic) experiment, and $1\times10^{-4} \sim 1\times10^{-2}$ G in an aircraft experiment. Further in the above methods, although acceleration in a vertical direction toward earth may produce near zero gravity, a small value of acceleration will remain. Therefore, when using these methods, it is important to record the acceleration change from time to time to determine the exact characteristics of the experiment. Also, experiments in a zero gravity environment are quite restricted in both time and cost. Therefore, it is desirable to obtain suitable data with a minimum number of experiments, and to collect data regarding acceleration changes for the purpose of improving the reliability of experimental results.

Conventionally, for the purpose of measuring acceleration, a measuring and recording apparatus having a dimension of 80 cm×80 cm×40 cm and a weight of 20 kg was required. This apparatus comprises an amplifier which amplifies the signal from an acceleration sensor, an AD converter which converts the signal from the amplifier to a digital signal, an external-memory device for storing the acceleration change data, and a pen type recorder or the like.

Such a conventional large and heavy acceleration measuring apparatus is acceptable for measuring the acceleration of an entire space ship (such as a space shuttle) or an entire aircraft, but when the measurement of a local acceleration in a restricted space is required, the use of such a large apparatus is not suitable.

Therefore, for measuring acceleration changes for zero gravity experiments such as in the development of materials as mentioned above, the conventional large type measuring apparatus cannot be applied to only a certain portion of an experiment. Thus the acceleration data obtained is the data of the acceleration change in the entire space ship or aircraft. However, this cannot precisely indicate the acceleration at a special position at which a special phenomena happens, so that the quality of the experiment is restricted.

For the purpose of overcoming these problems, a method using a conventional acceleration measuring and recording apparatus in which, for example, the acceleration sensor portion is divided into a control portion and a recording portion, and these portions are connected by a cable, is considered. However, in such case, disturbance of the system due to vibration and the like applied externally via the cable cannot be avoided. Thus, reliable data cannot be obtained. Further, when measuring speed, a high speed visual record using a video-camera or the like, cannot be obtained.

On the other hand, recent advances in semiconductor techniques have resulted in improved CMOS type static RAMs (a memory element which can be randomly written into or read from). This RAM has increased density and low power dissipation. As one example in which an characteristic features of this S-RAM are used, a method of constructing the external memory instead of a medium such as a magnetic tape, a magnetic disc, a floppy disc and the like, by using the S-RAM, is considered.

A characteristic feature of this S-RAM is high speed so that when used in a computer system, access time for a program or data can be considerably decreased compared with conventional techniques. Further, as there are no moving parts, the life span and reliability are increased. Further, in actual use in the computer system, the memory can be comprised of a single circuit board "RAM card".

To determine the correct connection of the RAM card, additional circuit connections or an optical or photo detector are conventionally used.

However, in the former case, since the number of connections must be increased, the size of the system must also be increased. On the other hand, in the latter method, since a light path must be provided for the photo detector, then it is difficult to construct a small size system. Even if the RAM card is positioned correctly, faulty connections could still exist which would not be detected by the photo detector.

Therefore, the conventional method is unfavorable as it is difficult to comprise a system using a RAM card that is small in size. On the other hand, in terms of reliability, the conventional method has a problem in that it is, difficult to definitely ascertain the connection state of the RAM card installed in the system.

SUMMARY OF THE INVENTION

An object of the present invention is to provide a small size apparatus for measuring and recording acceleration which can overcome the problems of the conventional acceleration measuring and recording apparatus and which can measure and record fine changes in acceleration by mounting the apparatus on a moving body or experimental system.

A small size apparatus for measuring and recording acceleration according to the present invention comprises an acceleration sensor, an AD converter which converts the signal from the acceleration sensor to a digital signal, a control element which processes the digital signal, and a detachable external memory device (so called "memory cassette") which stores a change in acceleration, so that the acceleration acting on the object can be measured by mounting the device on the moving object.

That is, in the present invention, in place of the pen type recorder used in the conventional acceleration recording apparatus, or the auxiliary recording apparatus such as a floppy disk, magnetic tape, and the like, the data is stored in a solid state memory device which is easily detachable from the measuring apparatus (circuit), the solid element being changed in accordance with the amount of data to be measured so that the measured acceleration data can be recorded at high speed and over a long period of time.

Another object of the present invention is to provide a memory medium detecting system by which confirmation of correct attachment of the external memory medium can be easily and surely carried out without using a special device.

For achieving the above-mentioned objects, the present invention provides a memory medium detecting system wherein correct connection of an external semiconductor memory device attached to a computer system is confirmed by the steps of writing certain data into a part or all of the memory device, reading the data back out of the memory device, and comparing it to the data written in the previous step, to confirm correct operation of the memory device.

That is, in the present invention, a write and read operation of the RAM card or memory cassette is used to write data into and read data out of the RAM or cassette card to verify that the memory cassette is correctly attached.

Another object of the present invention is to provide an improved method for carrying out a zero gravity experiment.

For achieving the above-mentioned object, the present invention provides a method for carrying out a zero gravity experiment by using a space shuttle or a trajectory (or parabolic) flight of an aircraft wherein the zero gravity experiment system is free floating from the space shuttle or the aircraft.

BRIEF DESCRIPTION OF THE DRAWINGS

FIGS. 11A to 11H are detailed examples of the circuits shown in blocks in the apparatus of FIG. 10;

FIG. 19 is a graph of a distribution of reduced gravity data when the experimental device is fixed to the aircraft.

DESCRIPTION OF THE PREFERRED EMBODIMENTS

Figure 1:
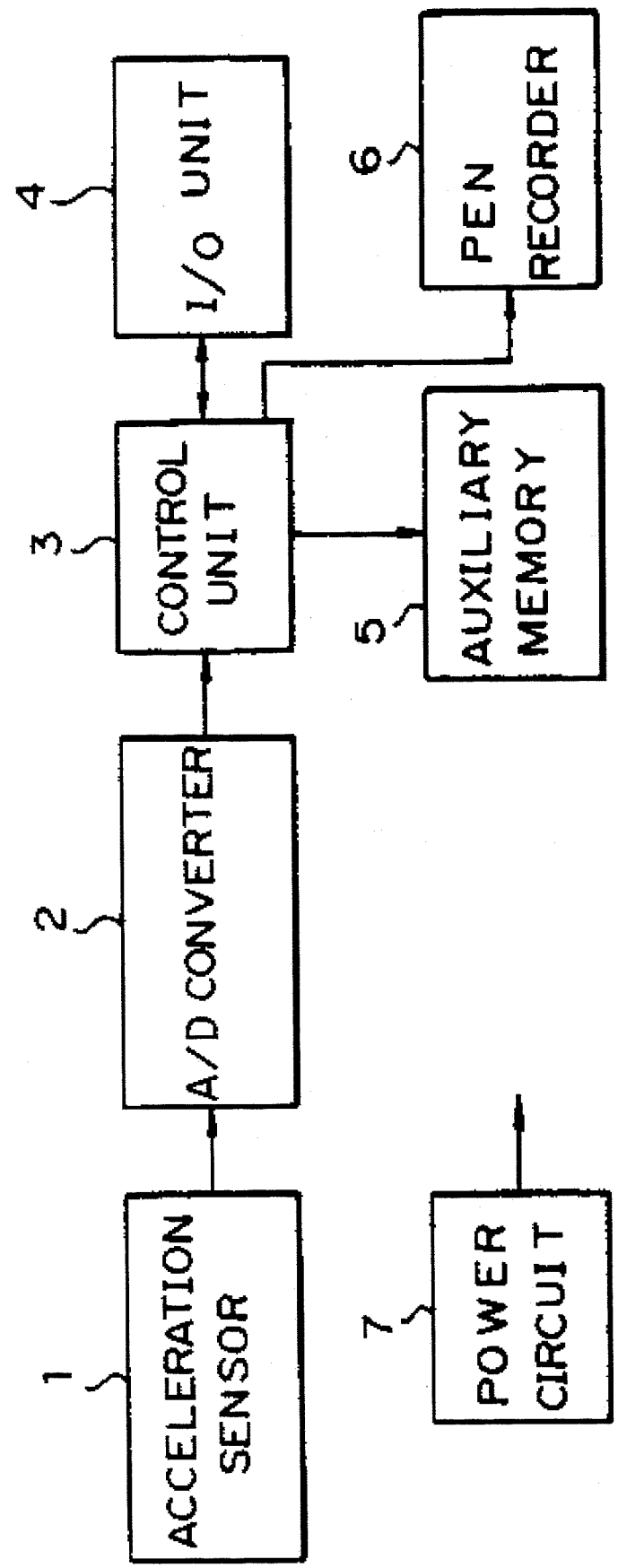
FIG. 1 is a block diagram of a conventional acceleration measuring and recording apparatus.

FIG. 1 is a block diagram of a conventional acceleration measuring apparatus. The apparatus shown in FIG. 1 comprises an acceleration sensor 1, an A/D converter 2, a control unit 3, an input/output unit 4, an auxiliary memory device 5, a pen type recorder 6 and an electric power supply source 7. This type of apparatus requires a dimension of 80 cm×80 cm×40 cm and weighs approximately 20 kg.

This conventional large and heavy acceleration measuring apparatus is acceptable in the measurement of the acceleration of an entire space ship (such as a space shuttle) or an entire aircraft, but when the measurement of a local acceleration in a restricted space is required, the use of such a large apparatus is not suitable.

Figure 2:
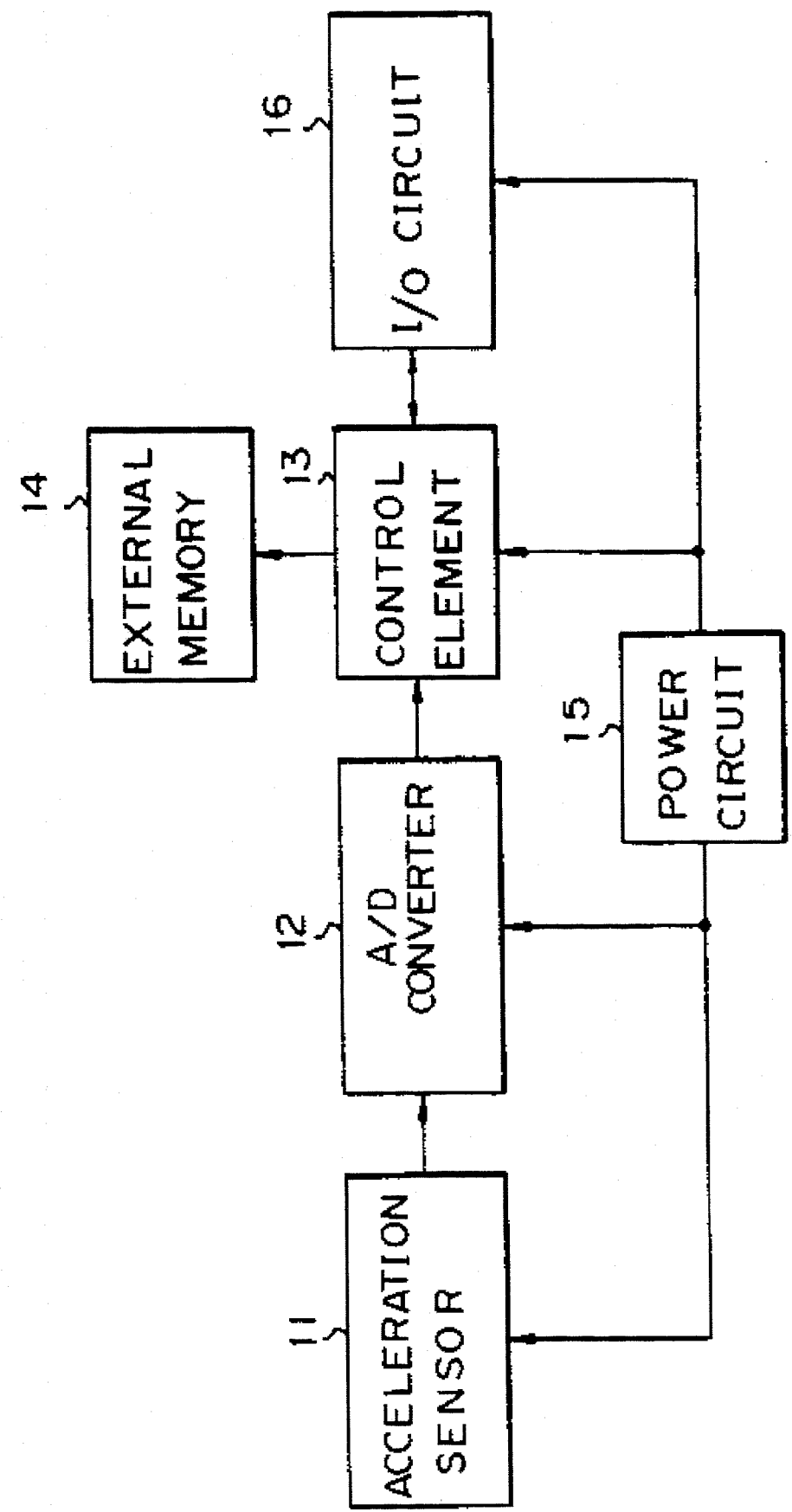
FIG. 2 is a block diagram of a principle of construction of the apparatus according to the present invention.

FIG. 2 is a block diagram of the present invention. In FIG. 2, 11 denotes an acceleration sensor, 12 an A/D converter, 13 a control element or a central processing unit (for example an 8-bit microprocessor), 14 a detachable high speed external memory, 15 an electric power source, and 16 an input-output interface circuit.

If, as the high speed external memory 14, a large capacity static or dynamic type RAM is used, the data can be backed up by a small battery, and a non-volatile type memory device can be realized. In particular, it is preferable to use a recording medium having a detachable non-mechanical driving portion (for example, a static RAM card backed up by a lithium battery) as the external memory device.

In the present invention, as shown in FIG. 2, a light and high speed detachable memory device is provided for the acceleration measuring and recording apparatus, and fine changes of acceleration with respect to time can be measured at high speed. The measuring speed thereof is a sampling time of less than one frame of a video image, and can correspond to video recording data in the measuring system.

Therefore, when it is required in an experiment to observe physical phenomena which changes rapidly in a restricted space, such as an aircraft or a space ship, it is possible to obtain data which could not be obtained by the conventional apparatus.

Figure 3:
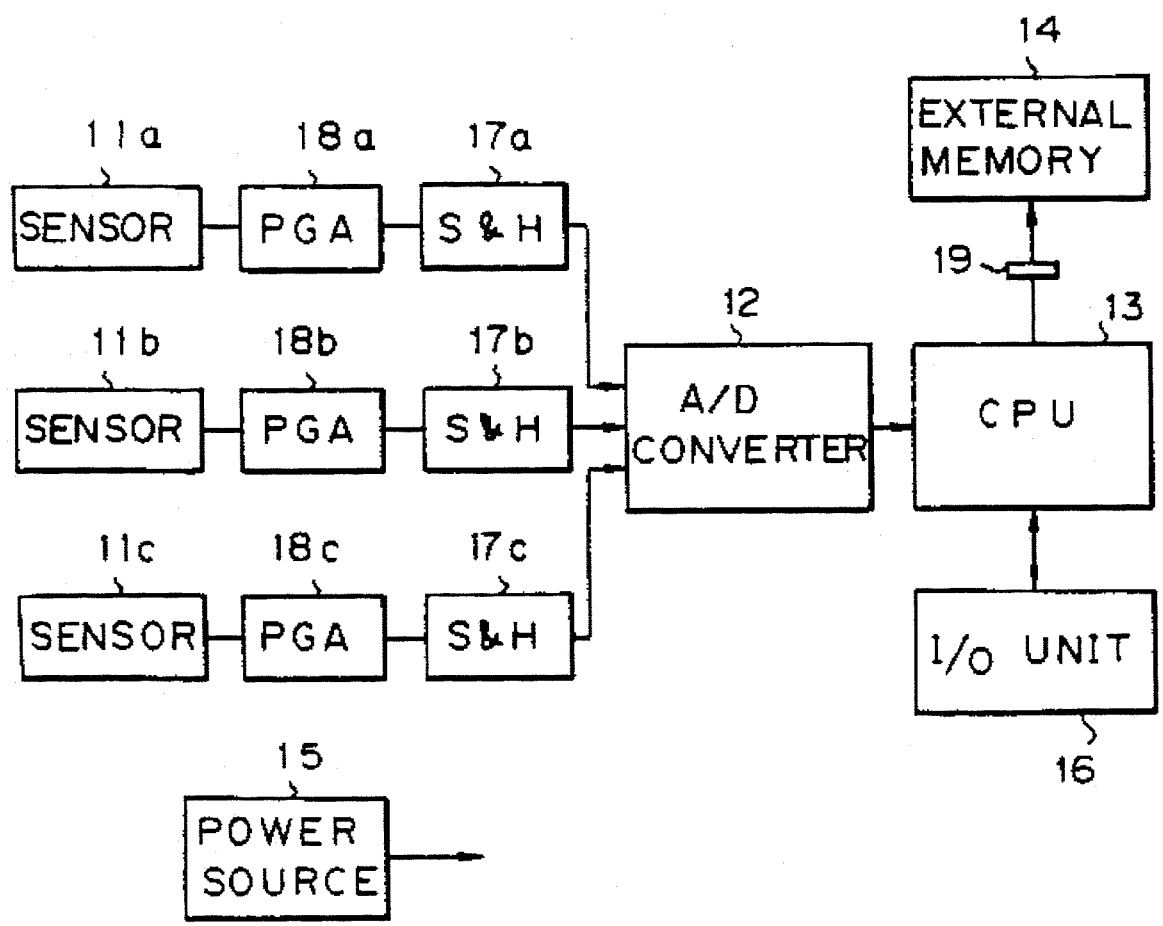
FIG. 3 is a block diagram of one embodiment of the apparatus according to the present invention.
Figure 4:
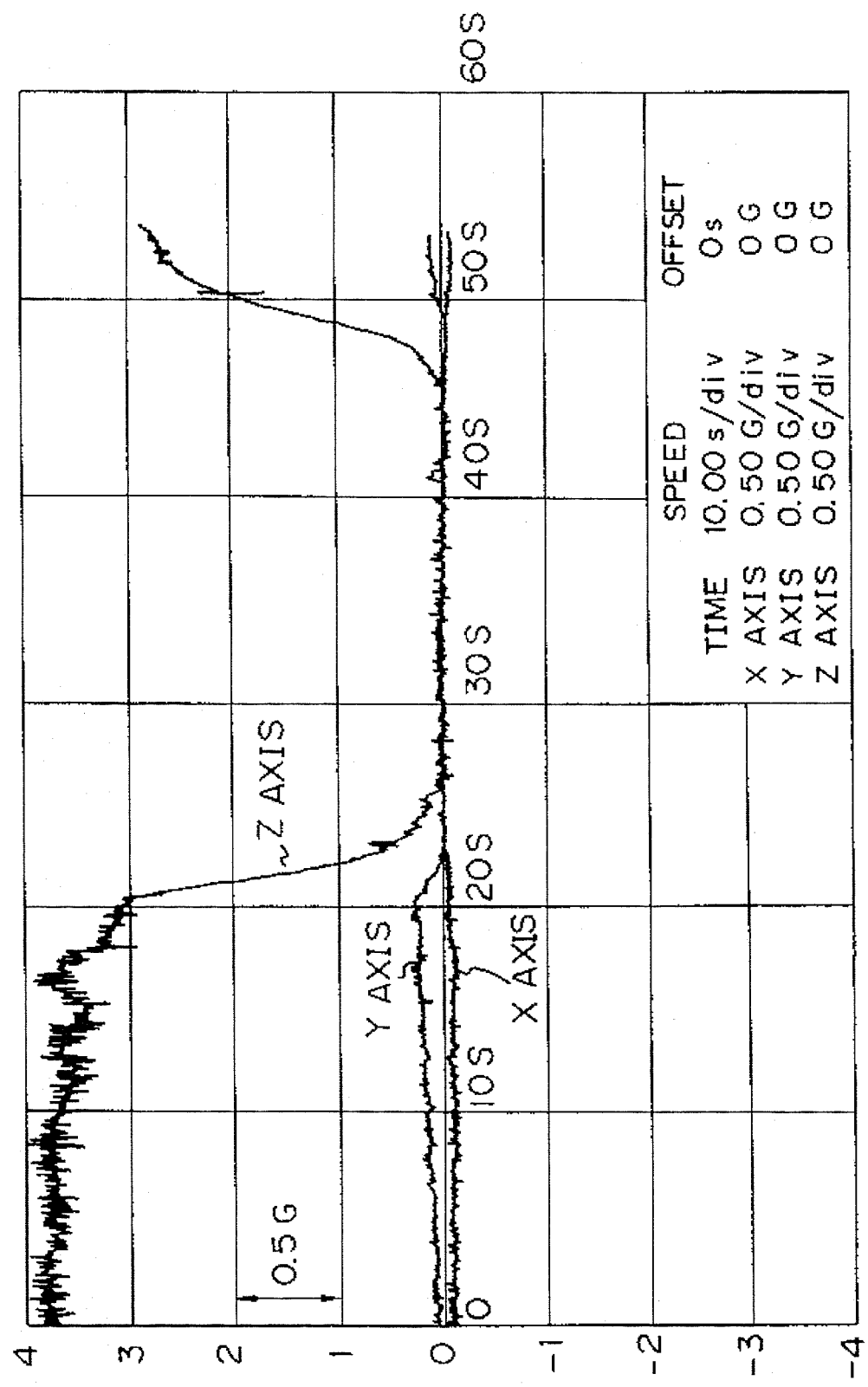
FIG. 4 and FIG. 5 are graphs of acceleration data obtained from a microgravity experiment using a parabolic flight airplane in the present invention.
Figure 5:
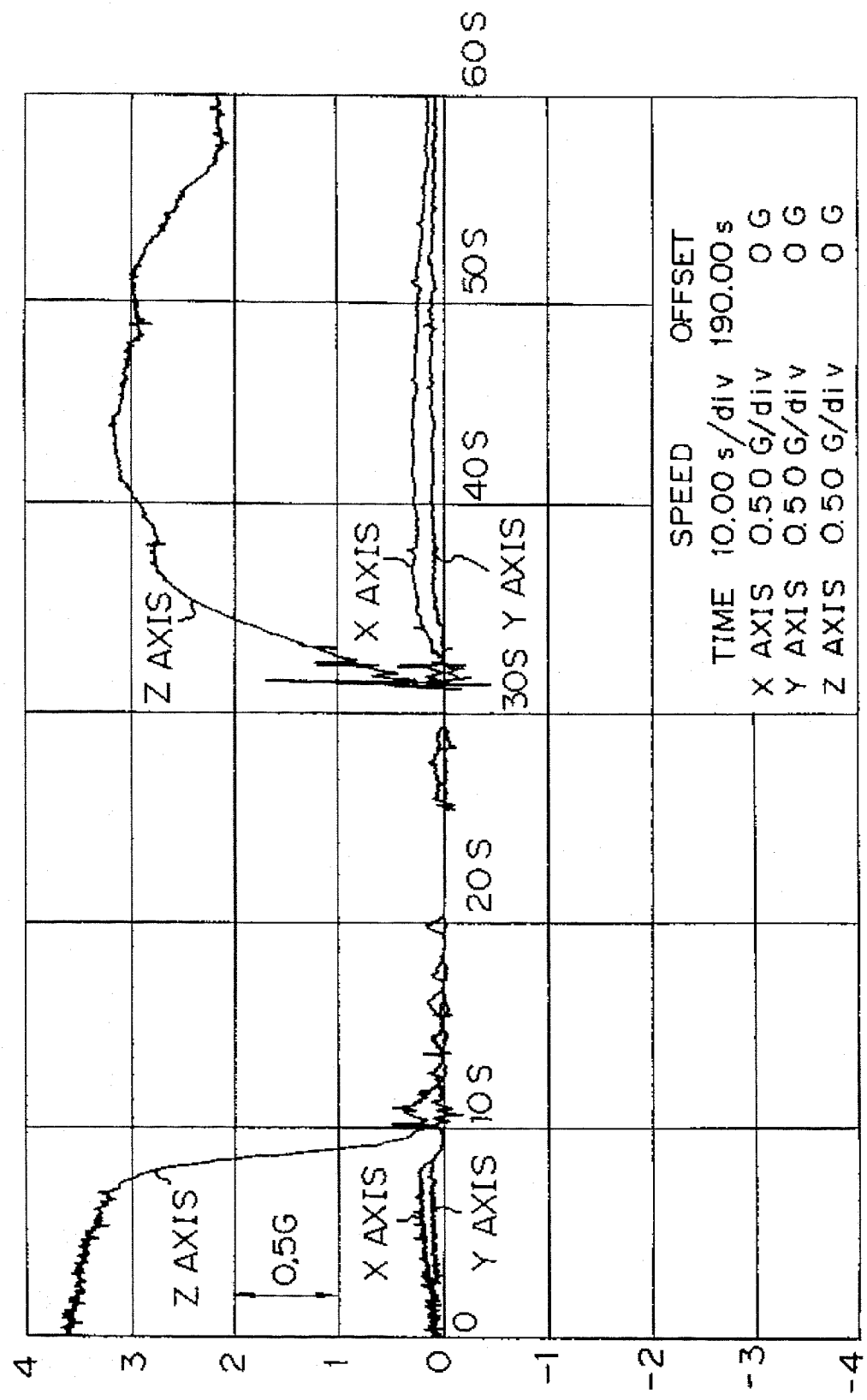

FIG. 3 is a block diagram of the present invention, in which a small size acceleration measuring and recording apparatus is shown. In FIG. 3, the same symbols as shown in FIG. 2 represent the same elements. In FIG. 3, 11a~11c are servo-type acceleration sensors (manufactured by Nippon Koku Densi Co., Ltd., JA5V), 12 is an A/D converter (AD7582, manufactured by Analog Devices Co., Ltd.), 13 is a central processing unit (MB68B09 manufactured by Fujitsu Ltd.), 15 is an electric power source circuit (Nickel-cadmium battery and a constant voltage apparatus), 16 is an LED display and a controlling switch. 14 is an external auxiliary record block formed by four "256 Kbit static RAMs", which is detachable from the main body via a multi-pole connector 19. In the measurement of acceleration, it is important that measurements be carried out in three dimensional directions. Simultaneously, three acceleration sensors (11a~11c), for example, are at right angles along the three dimensional axes. These outputs are stored in sample and hold circuits 17a~17c synchronized with a sampling signal, and then converted in the A/D converter 12 to a digital value. Further, for the purpose of enlarging the dynamic range of the measurement, variable gain amplifiers shown by 18a~18c are inserted between the acceleration sensors 11a~11c and the sample and hold circuits 17a~17c. The central processing unit 13 carries out all measuring operations in accordance with a program stored in a ROM (Read Only Memory) in the CPU 13. In this case, the sampling interval, and the start and end points of the acceleration measurement are input by external switches. Or, the start and end points of the acceleration measurement can be automatically determined by using, for example, the output signal from the acceleration sensor as a trigger, which changes in accordance with the trajectory or parabolic flight of an airplane. The trajectory flight is carried out with the acceleration in the Z direction as shown in FIG. 4 and 5 (which will be explained later). The instant the acceleration changes from high to low and goes below a predetermined value is used as a starting point, and the instant the acceleration is changed from low to high and goes above a predetermined value is used as an end point. The sample and hold unit 3 carries out the sampling automatically. The control circuit may always measure the gravity condition in the aircraft. The control unit 3 also determines a sampling time of the experimental apparatus to begin free floating or to start the zero gravity experiment, and, to end the gravity experiment or to end free floating. The sampling time is fed back to a mechanism for free floating so that the sampling time can be controlled. The gain control of the variable or programmable gain amplifiers 18a~18c is determined by the central processing unit 13 which automatically calculates the measured value for the full scale value.

The main body is a cube shape of, for example, 12 cm×18 cm×12 cm, and has a weight of approximately 1 kg.

The data recorded in the external auxiliary memory of the small size acceleration measuring and recording apparatus according to the present invention can be read out and processed by other apparatus, after the experiment is completed.

One example of the measured data in the embodiment of the present invention is shown in FIGS. 4 and 5. 10 FIGS. 4 and 5 are graphs of acceleration data from a gravity experiment using a trajectory flight experiment aircraft KC-135 used by the National Aeronautics and Space Administration (NASA).

FIG. 4 is the acceleration data obtained by fixing the experimental apparatus on the floor of the KC-135. In FIG. 4, the abscissa shows time and the ordinate shows acceleration when the experimental apparatus is fixed on the floor. In FIG. 4, during the first 20 seconds, an acceleration of about 2 G (two times the force of gravity) is recorded in the Z (vertical) direction. During the next 20 seconds, there is a decrease in gravity due to a reduction or stopping of engine propulsion. However, the acceleration of the vibration due to the engine and the variation of the air at about ±70 mG, cannot be neglected.

That is, FIG. 4 shows a pattern of a typical acceleration change when the experimental apparatus is fixed on the floor of the aircraft. In an initial state of the trajectory flight, a high gravity, about 1.8 G, is observed in the Z direction. However, after about 25 seconds, due to the fall of engine propelling power, it reaches a reduced gravity state below 0.1 G. Further, in the Y axis direction, an acceleration of about 0.2 G is applied in the initial state of the trajectory flight, giving an apparent attitude of the aircraft and the propelling power. At a final state of the trajectory flight, a high gravity level due to the recovery of the body is applied.

FIG. 5 is data measured with the whole measuring apparatus including the small size acceleration measuring and recording apparatus floating away from the floor of KC-135, according to the present invention. During the first 10 seconds, a high gravity level is recorded as in FIG. 4. The next 10 seconds is a period when the whole experimental apparatus is floated manually and the vibration caused by contacting the apparatus is recorded. In the above explanation, the complete experimental apparatus refers to, for example, a crystal growth experiment facility, or in particular an apparatus for growing protein crystals or semiconductor crystals of Si or Ge, or group III-V compound semiconductor crystals such as InP or GaAs. The apparatus can also be, for example, an automated biopolymer crystal preparing apparatus as disclosed in U.S. Pat. No. 4,755,363 or Fujitsu Scientific & Technical Journal 1988, vol 24, No. 2 p 126–131. Also, methods of handling a liquid relating to an element technique of an experimental apparatus for growing a protein in space, or behavior of a free surface of a liquid droplet, the basic data, for example, of a critical G level affecting an aqueous solution droplet stability, or fusion of two aqueous solution droplets, are employed. However, during the next 5 seconds, as the whole apparatus is in a low gravity state, it starts falling gradually to the floor of the KC-135. Then, the whole apparatus goes into a floating state, and the recorded acceleration is almost zero, proving that a very high quality zero gravity environment is realized. Thus experiments in a zero gravity state are possible.

Figure 6A:
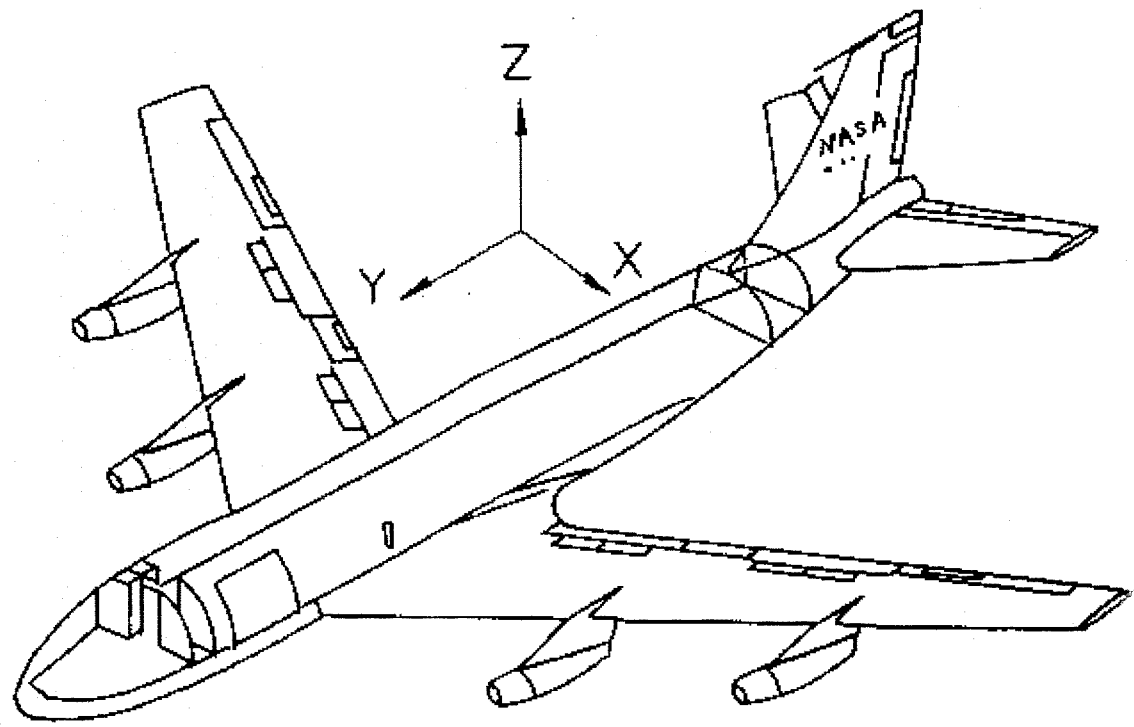
FIG. 6A defines the configuration of the axis for measuring acceleration in the parabolic flight airplane KC-135.

Further, FIG. 6A shows X, Y and Z axes in the trajectory flight experiment of FIGS. 4 and 5.

The zero gravity experiment aircraft KC-135 shown in FIG. 6A was originally used for aerial refueling. This high performance aircraft became the original jet airliner Boeing B-707. NASA improved this aircraft for use in various zero gravity experiments.

Figure 6B:
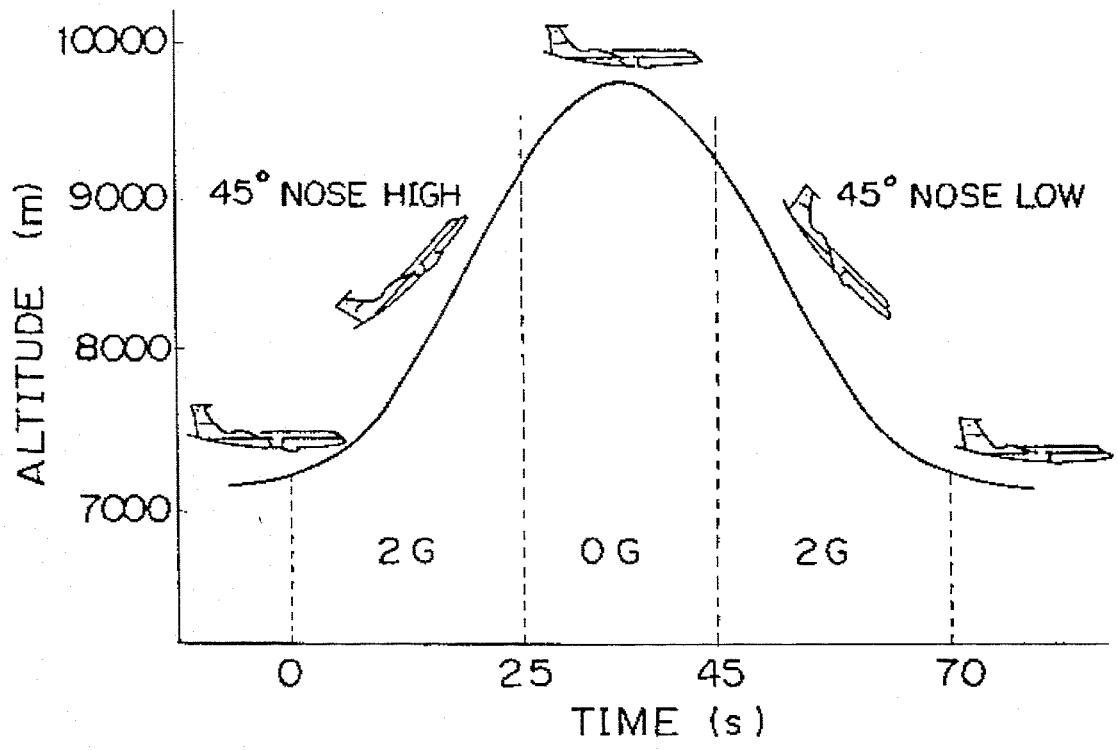
FIG. 6B shows the KC-135 aircraft trajectory.

One flight pattern trajectory is shown in FIG. 6B. The experiment was carried out in four sets of ten flights and was repeated over a total of three days for a total of 120 times. Since each experiment lasts for a period of about 20 seconds, a total time of 20 sec×120=2400 sec=40 min. can be provided. This system was mounted on an experimental module and experiments were carried out over Mexico Bay in the U.S.A.

From this data, the usefulness of the small size acceleration measuring and recording apparatus of the present invention for checking acceleration data when a high quality gravity environment is required, is clear.

FIGS. 7A to 7J are flow-charts explaining the operation of the device shown in FIG. 3.

Figure 7A:
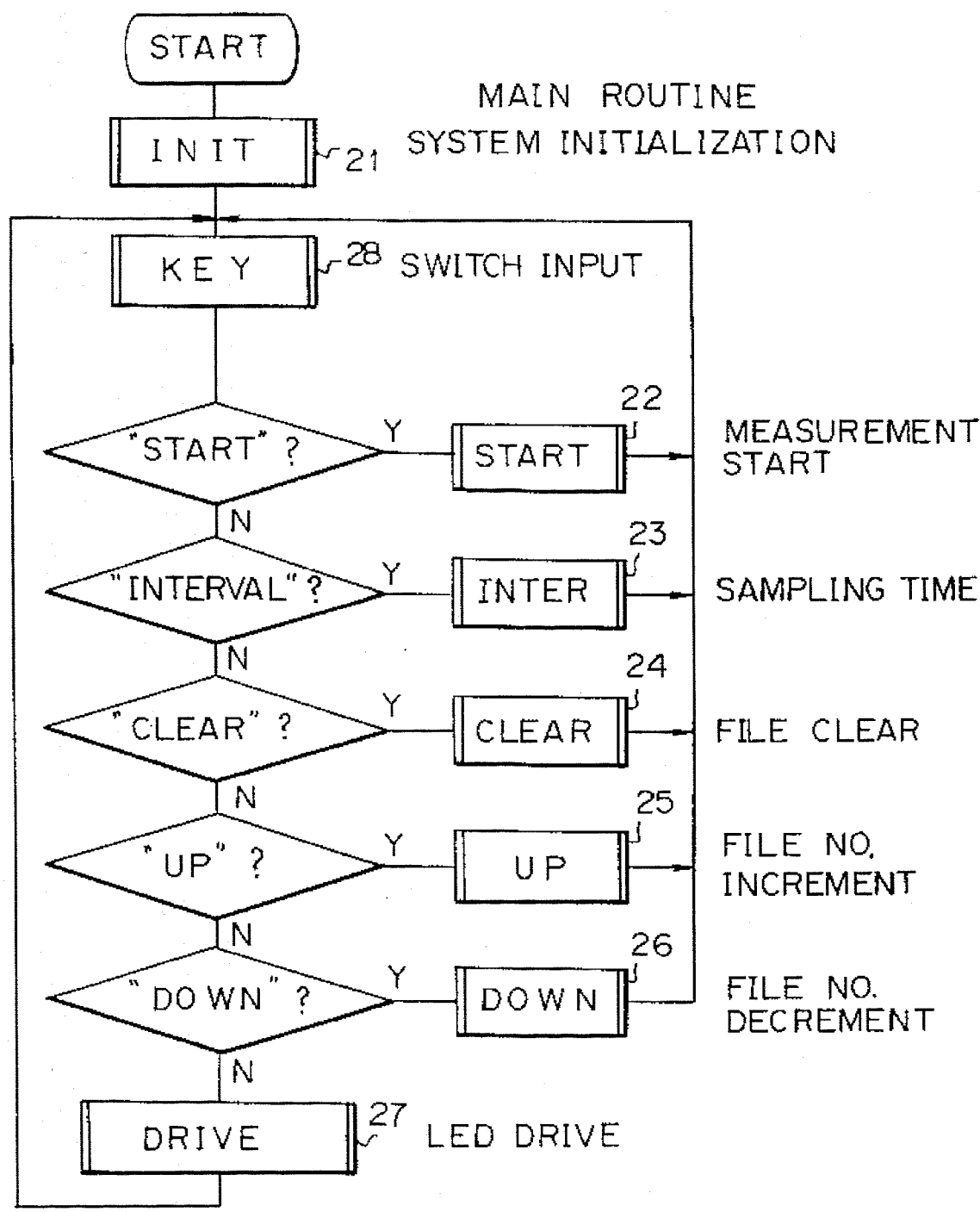
FIGS. 7A to 7J are flow charts explaining the operation of the apparatus shown in FIG. 3.

FIG. 7A is a flow-chart of a main software routine in the device shown in FIG. 3. The steps of system initialization are shown in block 21, a measurement routine shown starting from START is shown in block 22, an interval time change starting from INTER is shown in block 23, a file clear routine starting from CLEAR is shown in block 24, a file number increment routine starting from UP is shown in block 25, a file number decrement routine starting from DOWN is shown in block 26, an LED drive routine is shown in block 27, and a switch input routine is shown in block 28.

Figure 7B:
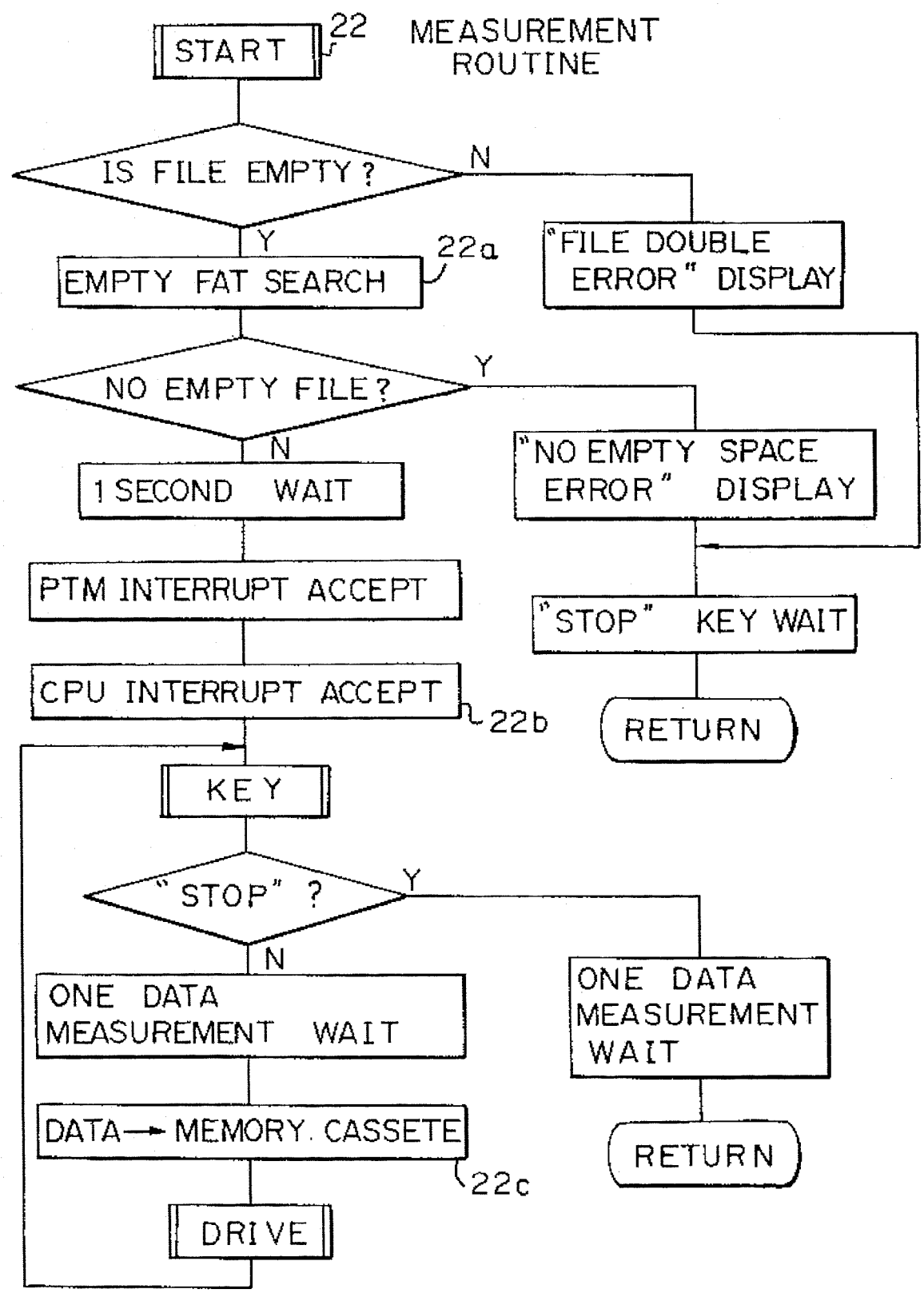

FIG. 7B is a measurement routine. A file allocation table in block 22a is searched and when an empty file exists, a CPU interrupt accept is given in block 22b, data is written into a memory cassette in block 22c and the measurement routine is entered.

Figure 7C:
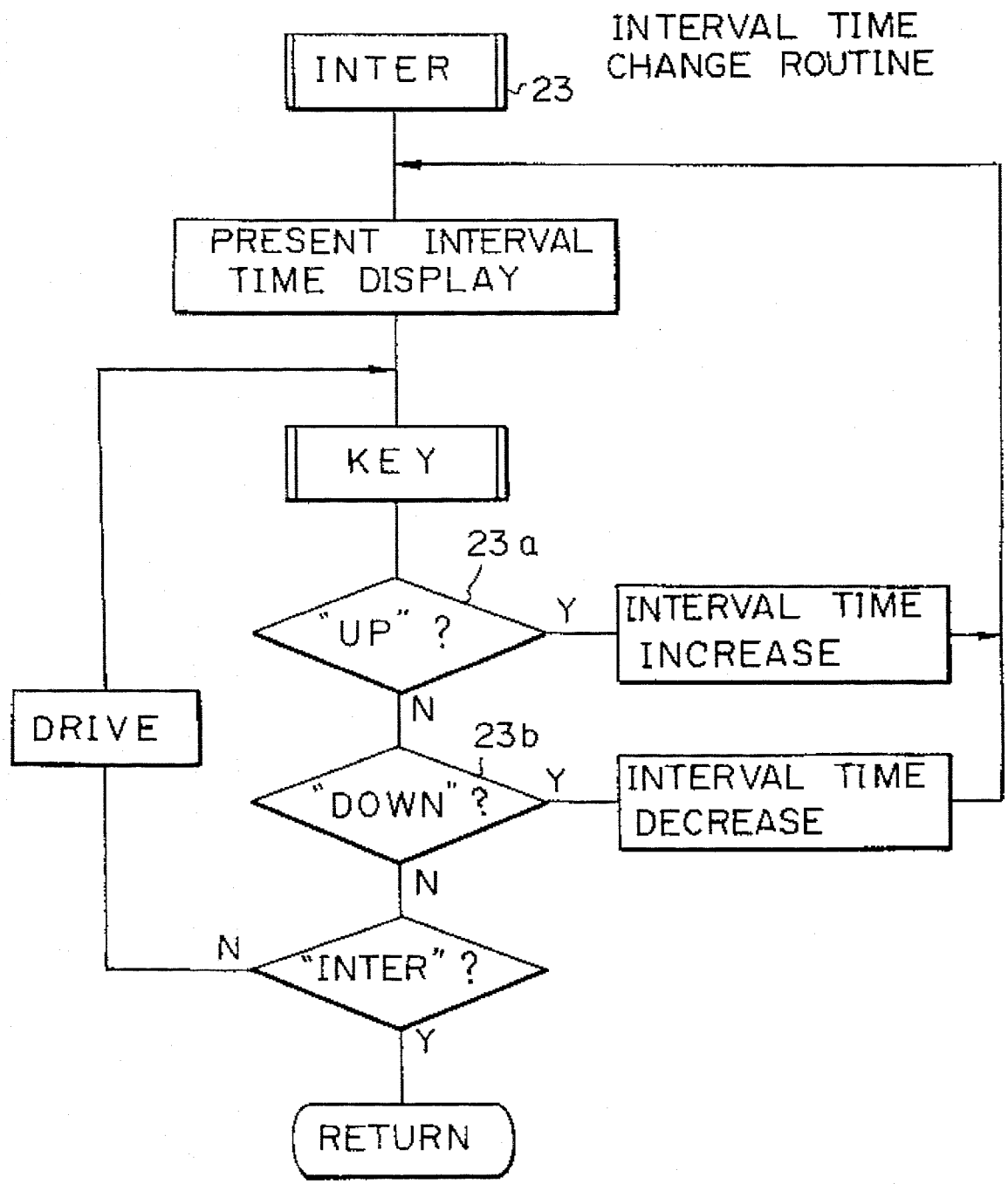

FIG. 7C is the interval time change routine. Whether a measurement interval time is to be increased or decreased is decided in blocks 23a and 23b.

Figure 7D:
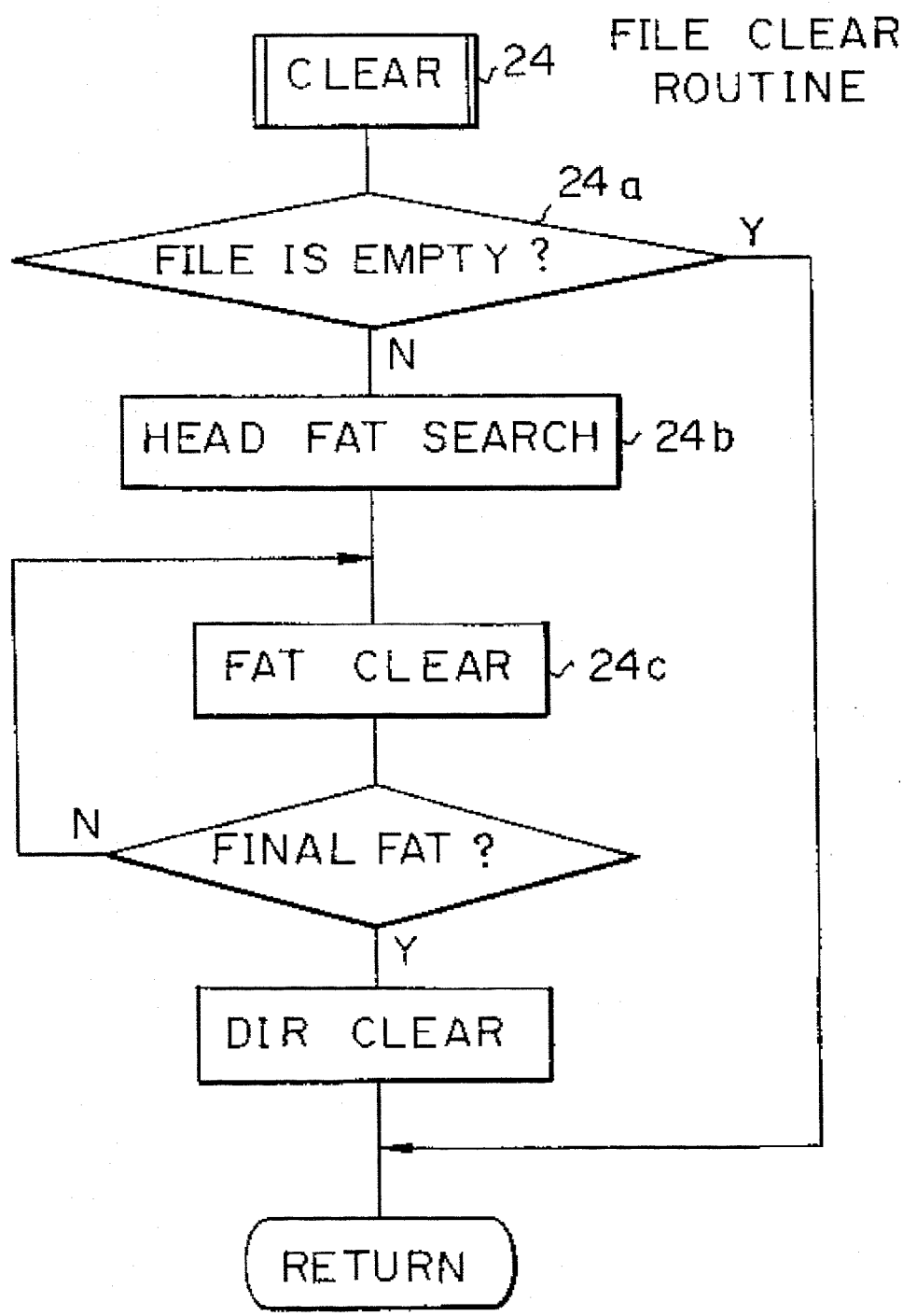

FIGS. 7D is a file clear routine. When the file enters a non-empty state in block 24a, the head file allocation table is searched in block 24b and the file allocation table is cleared in block 24c. DIR is a directory.

Figure 7E:
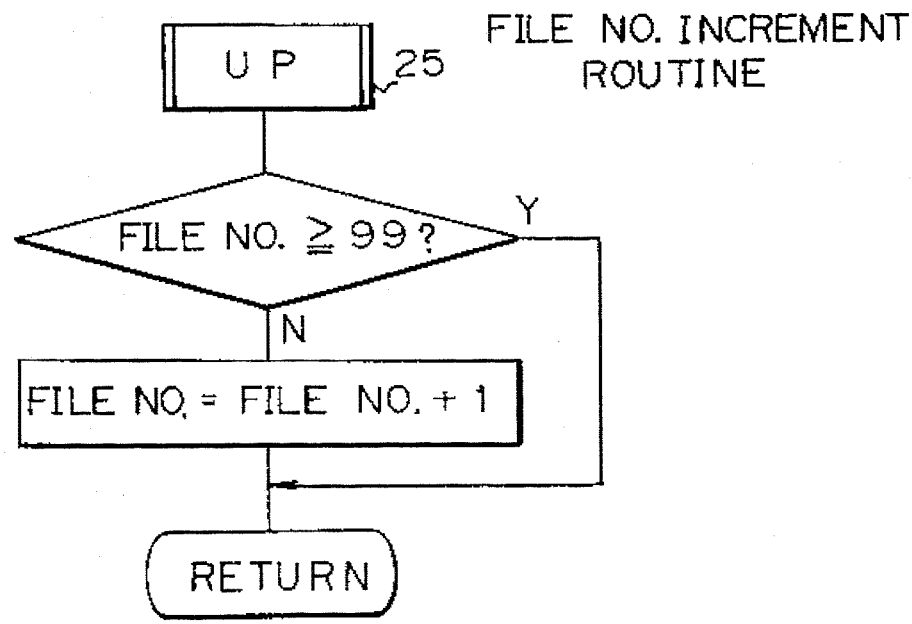
Figure 7F:
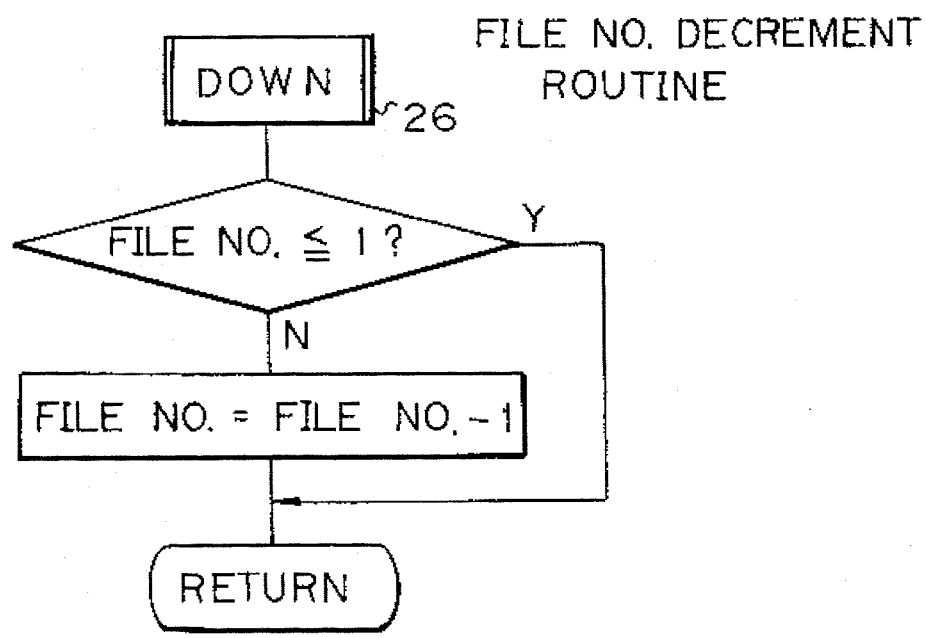
Figure 7G:
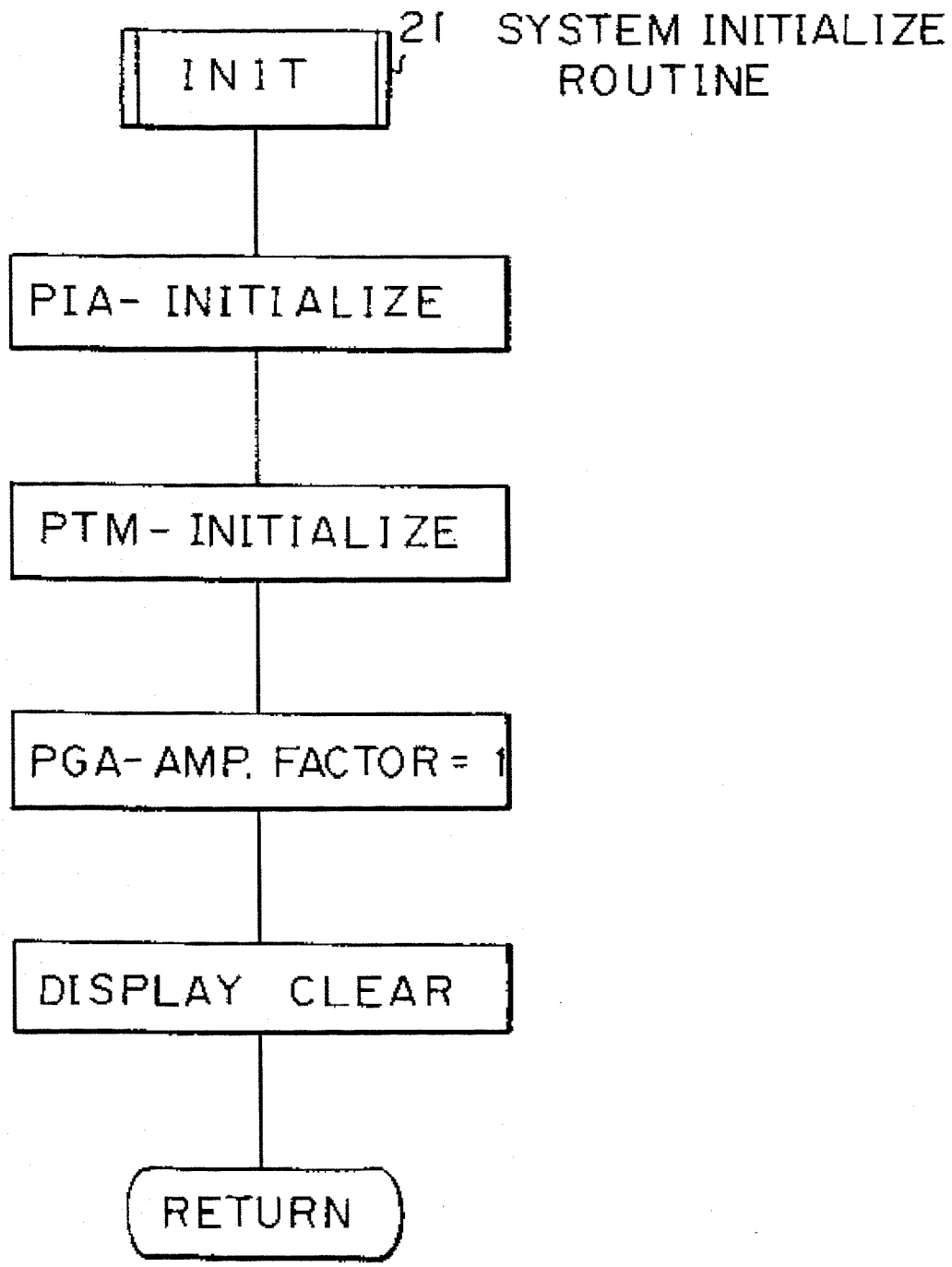

FIGS. 7E and 7F are file number increment and decrement routines. FIG. 7G is a system initialization routine.

Figure 7H:
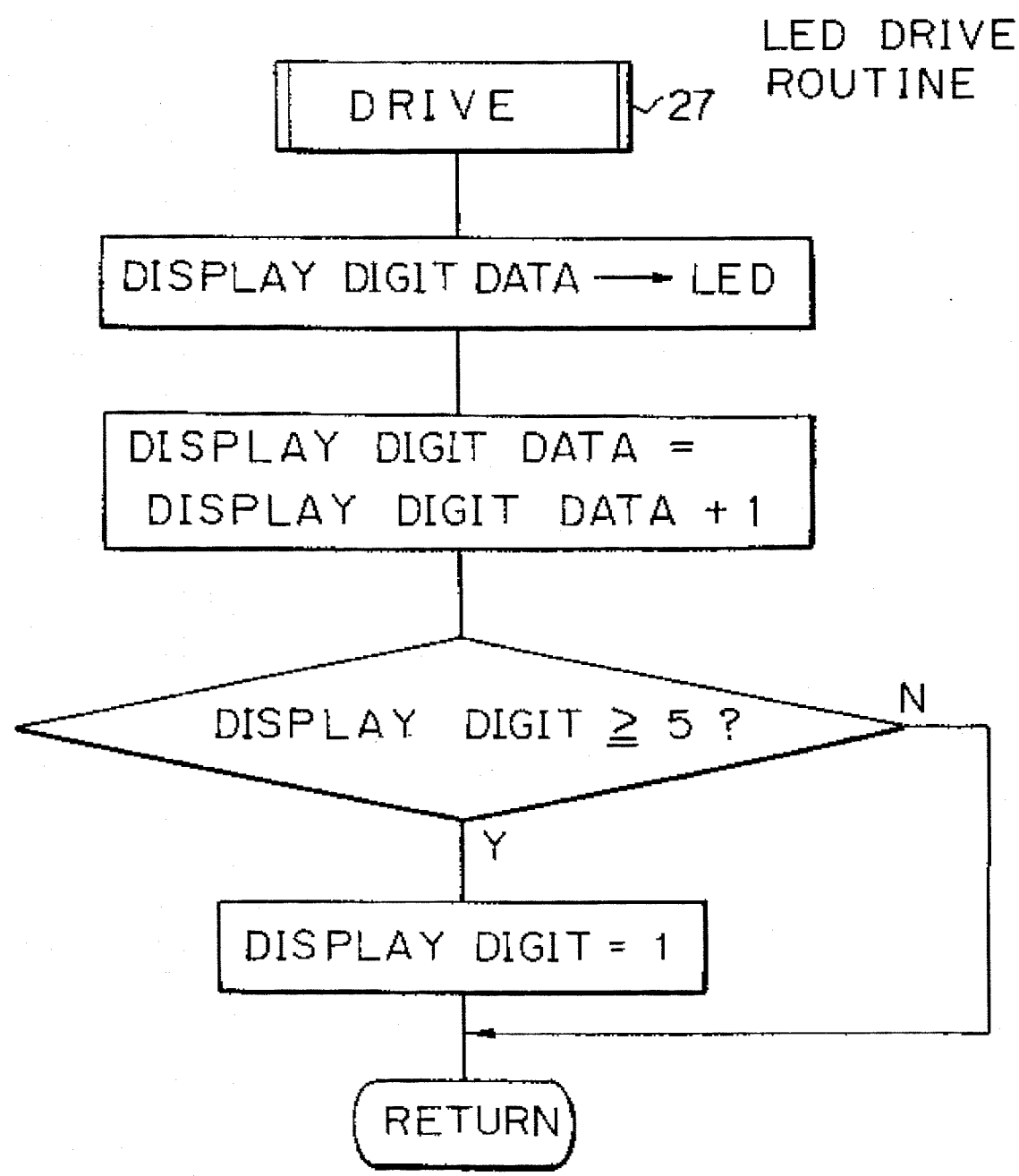

FIG. 7H is an LED drive routine for displaying digit data on the LED.

Figure 7I:
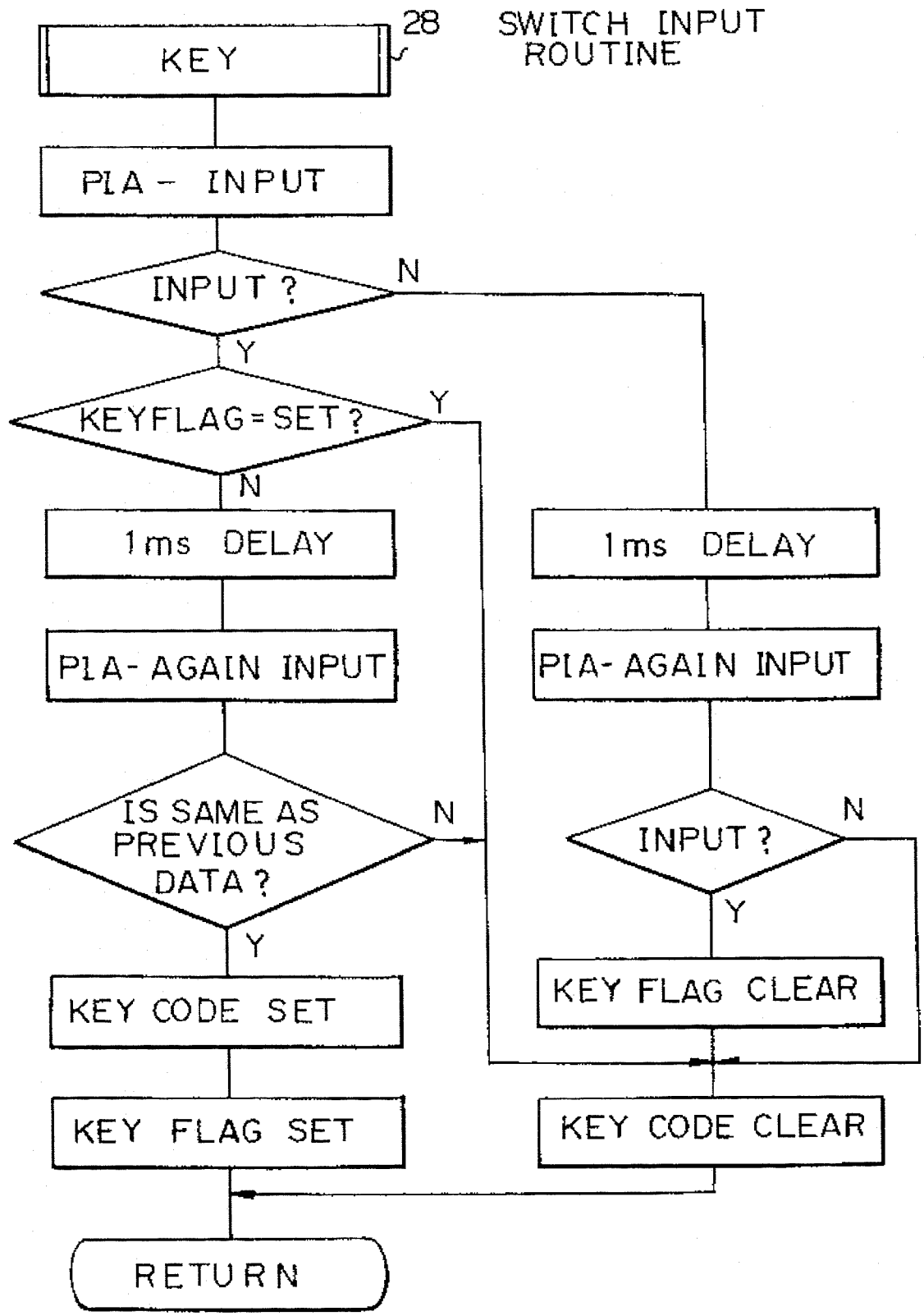

FIG. 7I is a switch input routine.

Figure 7J:
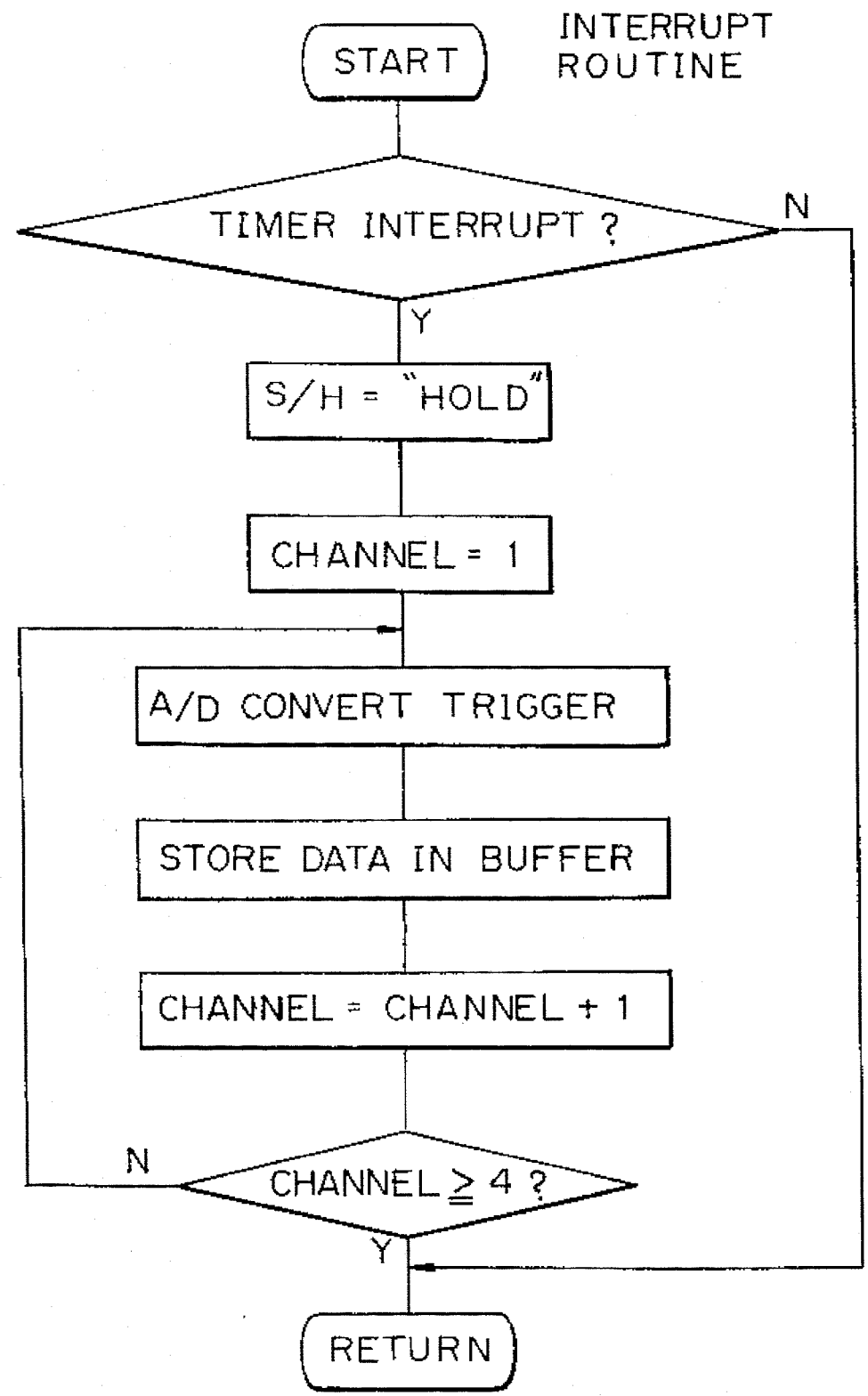

FIG. 7J is an interrupt routine. When an operation is interrupted, a sample and hold circuit is actuated and the held data is converted into digital data which is stored in a data buffer.

In the present invention, the memory medium using a semiconductor memory element is used in the computer system as an external memory medium. Whether the attachment is complete or not is confirmed by a partial writing and reading of a portion of the external memory.

Figure 8:
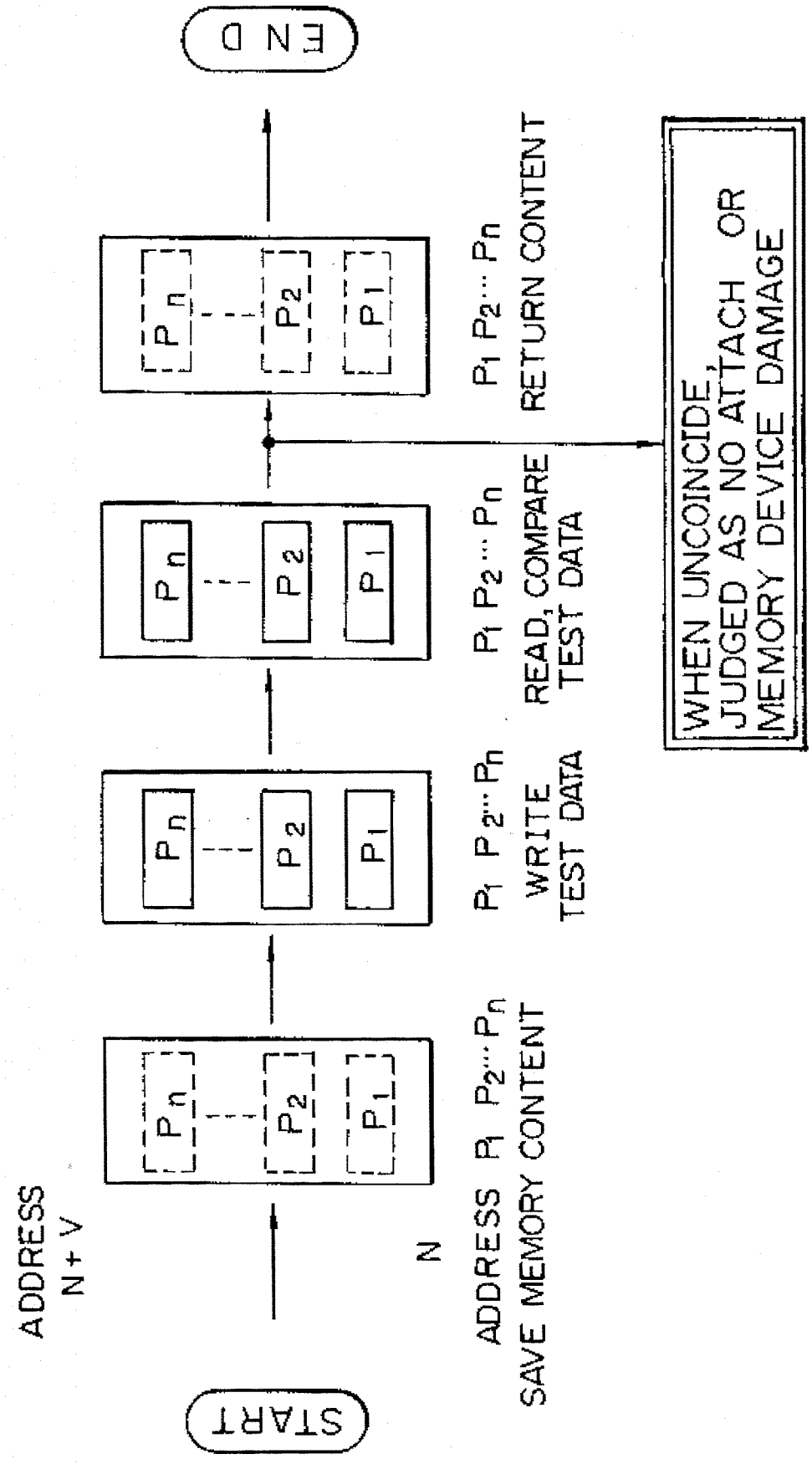
FIG. 8 is a diagram showing the principle of confirming correct attachment of an external memory in the apparatus shown in FIG. 3.

FIG. 8 is a diagram showing a principle of confirming the attachment of an external memory as shown in FIG. 3. In FIG. 8, when the addresses allocated to the memory cassette are assumed as N~N+V (N is a start address and V is a total number of address locations), the addresses $P_1, P_2, \ldots P_n$ are selected at a suitable distance by which the specified address lines do not overlap. After data is written into this address, the data is immediately read out to confirm its correlation with the written data. This check is then repeated several times until all of the addresses have been checked and it is confirmed that the memory cassette is correctly attached.

In the present invention, no additional hardware is required beside electrical contacts. That, only electric power supply lines, address lines, data lines, and write and read control lines are required for the memory cassette. Therefore, the space required can be reduced and the system can be realized having a small size and light weight. Further, as the write and read operations for a plurality of addresses are carried out, the test of whether or not the contacts are connected or whether the S-RAM in the memory the cassette or cassette is correctly functioning can also be carried out.

Figure 9:
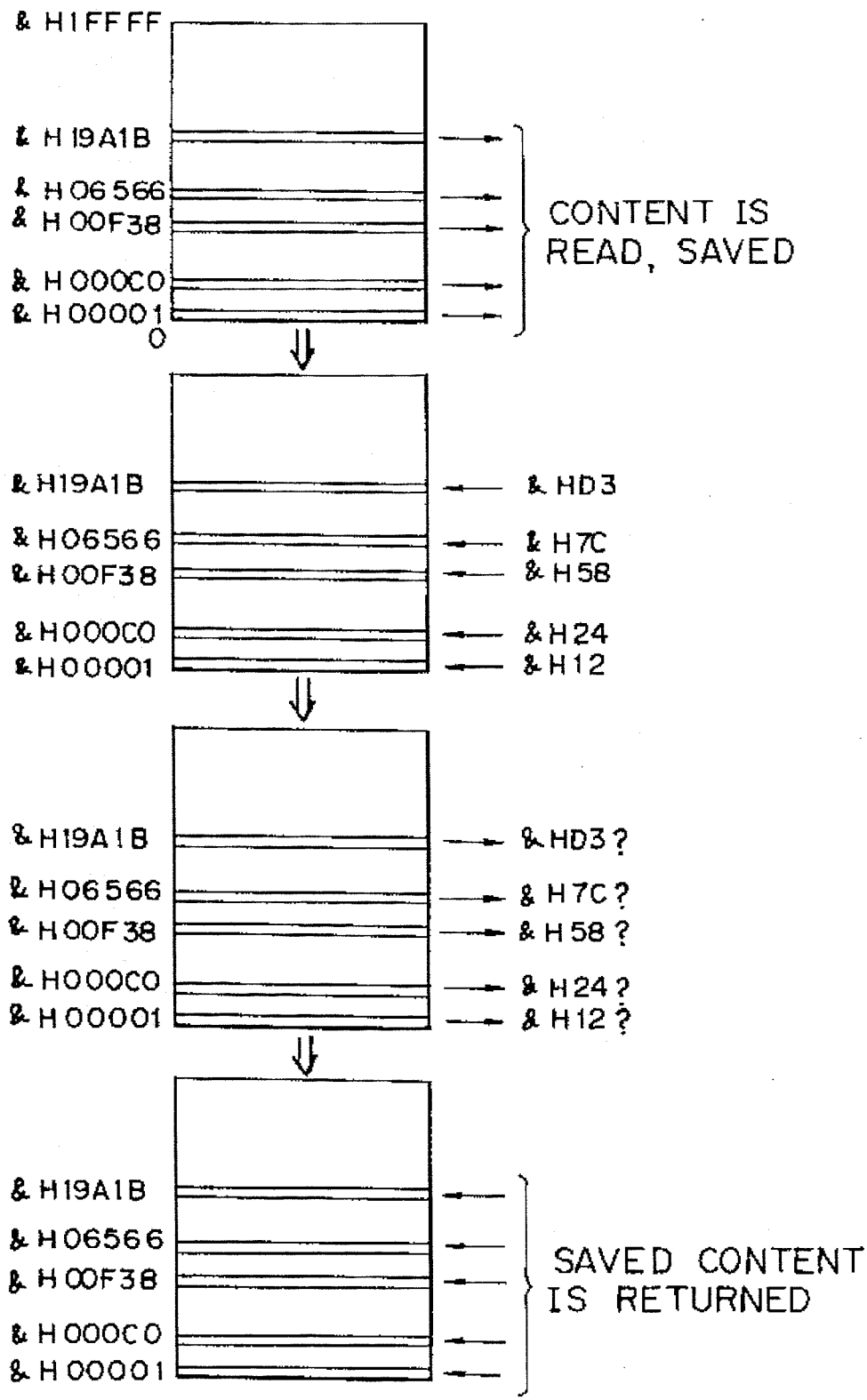
FIG. 9 is a diagram showing one embodiment for confirming the attachment of the external memory shown in FIG. 8.

FIG. 9 is one embodiment of the present invention when the memory medium detecting system of the present invention is applied to a 128 kbyte memory cassette or cassette.

In the memory space of 128 kbyte, the data stored in addresses &H00001, &H000C0, &H00F38, &H06566, &H19A1B (&H indicates hexadecimal numbers), for example, is temporarily saved. Next, data &H12, &H24, &H58, &H7C, &HD3 are written into these addresses, respectively, and read out immediately thereafter. If the data read out completely coincides with the data written in, it is deemed that the memory cassette is correctly attached. If the data read out does not completely coincide with the data written in it is deemed that the memory cassette is not attached. When there is partial coincidence, it is considered that the memory cassette or the connection is defective, and therefore, in that case, a suitable process (displaying an error message and the like) is carried out.

Figure 10:
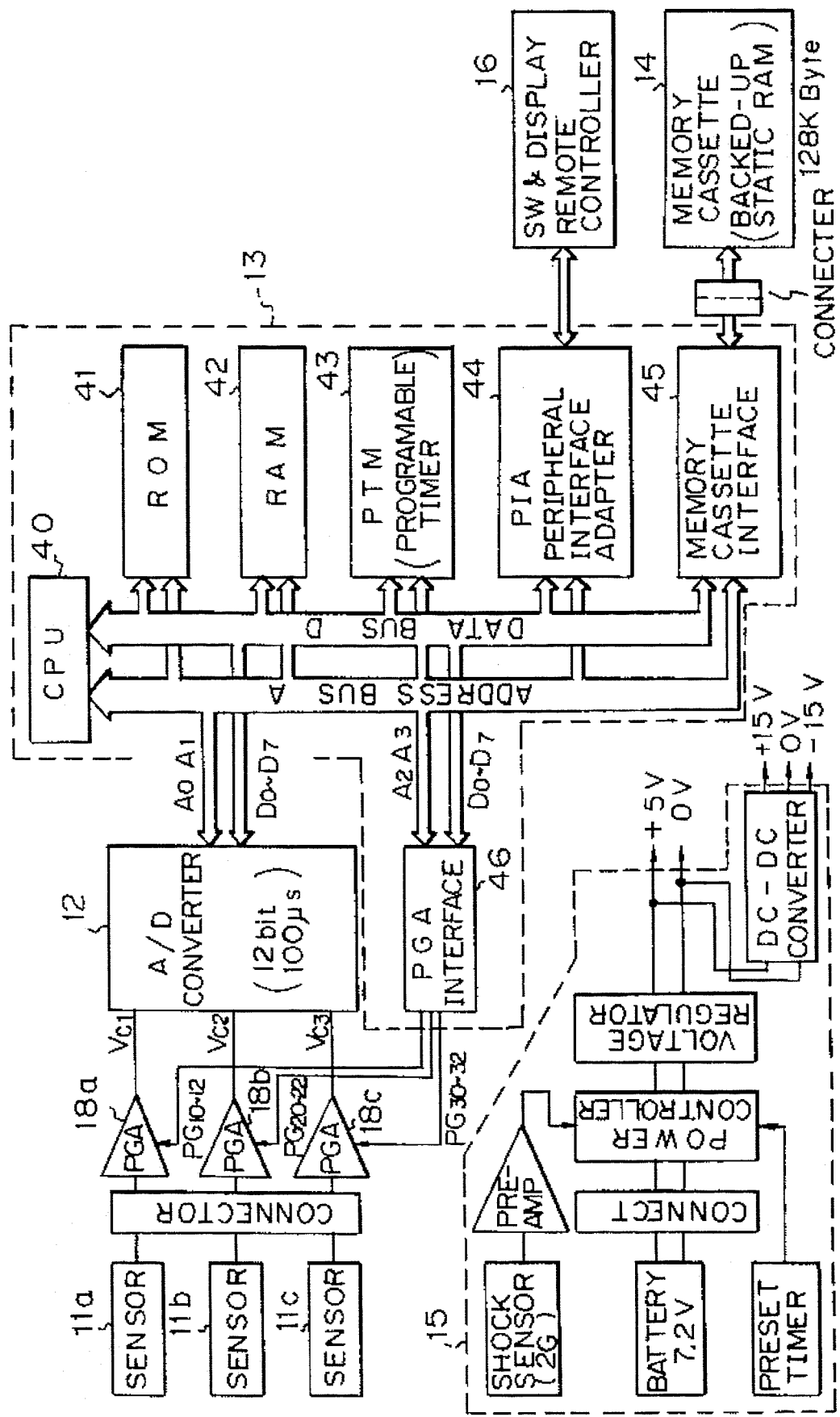
FIG. 10 is a more detailed block diagram of the apparatus according to the present invention shown in FIG. 3.

FIG. 10 is a more detailed block diagram of the apparatus according to the present invention shown in FIG. 3. In FIG. 10, the same reference numerals are used for the corresponding parts in FIG. 3. FIGS. 11A to 11H are detailed examples of the circuits shown in blocks in the apparatus of FIG. 10.

FIG. 11A is a control portion 13 in FIG. 10, the portion shown in FIG. 11A includes a CPU 40, a ROM 41, a RAM 42, a PTM (programmable timer) 43, a PIA (peripheral interface adapter) 44, and a memory cassette interface 45. As shown in FIG. 11A, the ROM 41, the RAM 42, the PTM 43, the PIA 44 are coupled to the CPU via the address bus A ($A_0$~$A_{15}$) and the data bus D ($D_0$~$D_7$). The elements 40–44 are formed respectively by $IC_1$ (MBL68B09), $IC_2$ (MB2764-20), $IC_3$ (MB8464A-10LLP), and $IC_4$ (MB8873H), $IC_5$ (MB8874H).

Figure 11B:
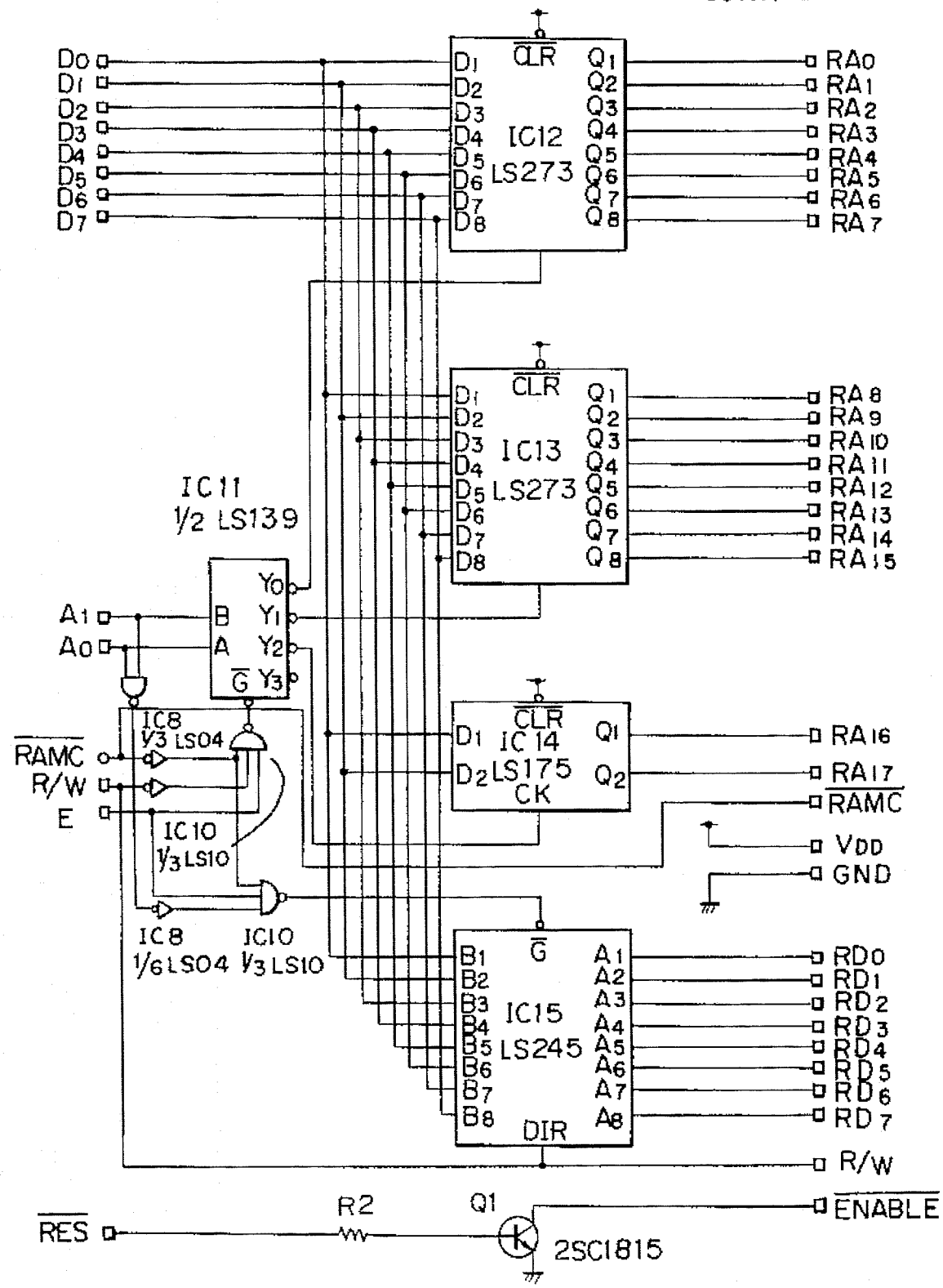

FIG. 11B is a memory cassette interface 45 shown in FIG. 10, and the memory cassette interface 45 is connected between the CPU 40 and the memory cassette 14 via the address bus A, the data bus D and the connector.

Figure 11C:
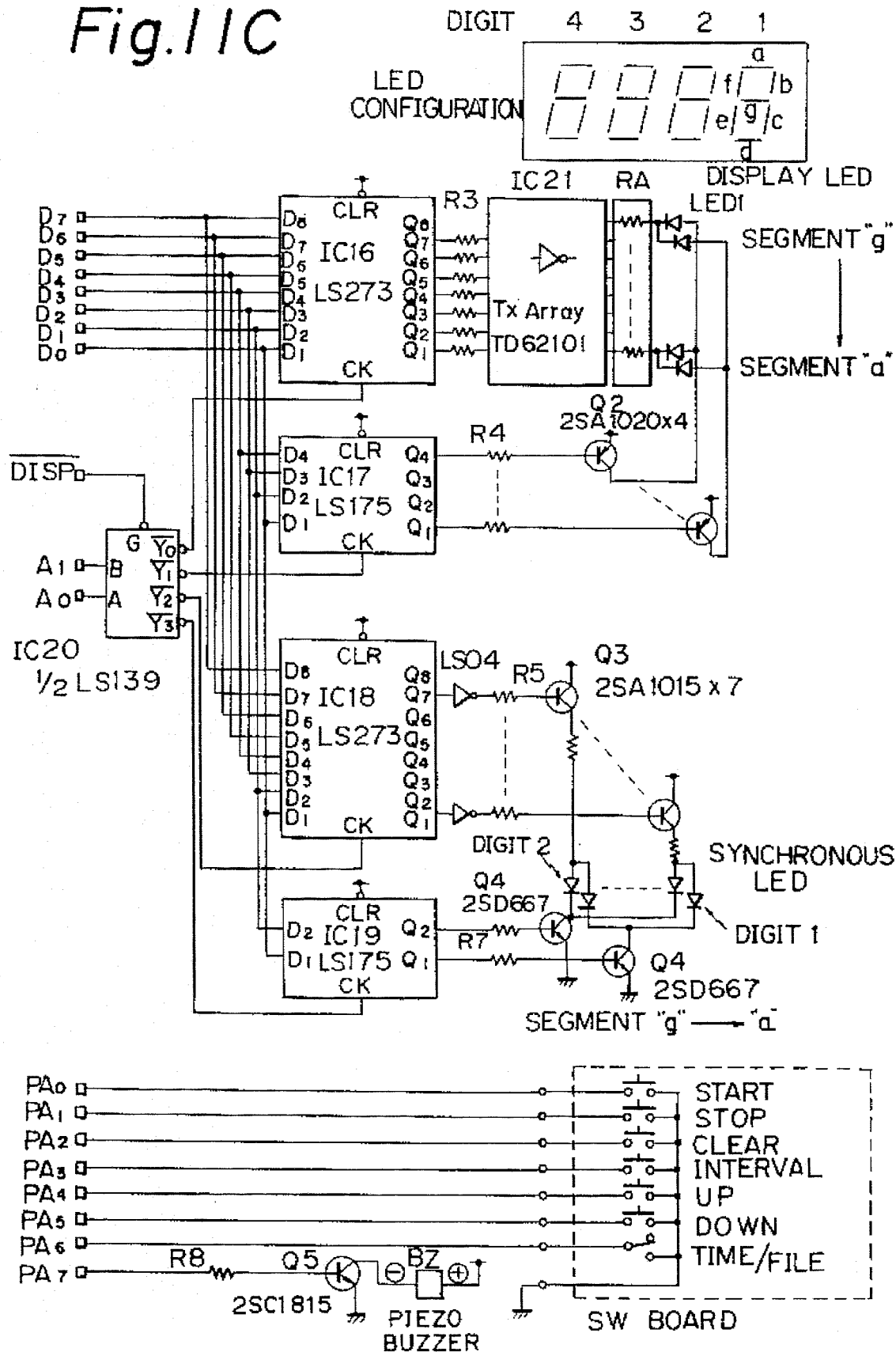

FIG. 11C is the switch, display, and remote controller 16 shown in FIG. 10 (which corresponds to the I/O unit 16 shown in FIG. 3), and an upper portion of FIG. 11C shows a display portion having an LED configuration display and a lower portion of FIG. 11C shows the switch and the remote controller portion.

Figure 11D:
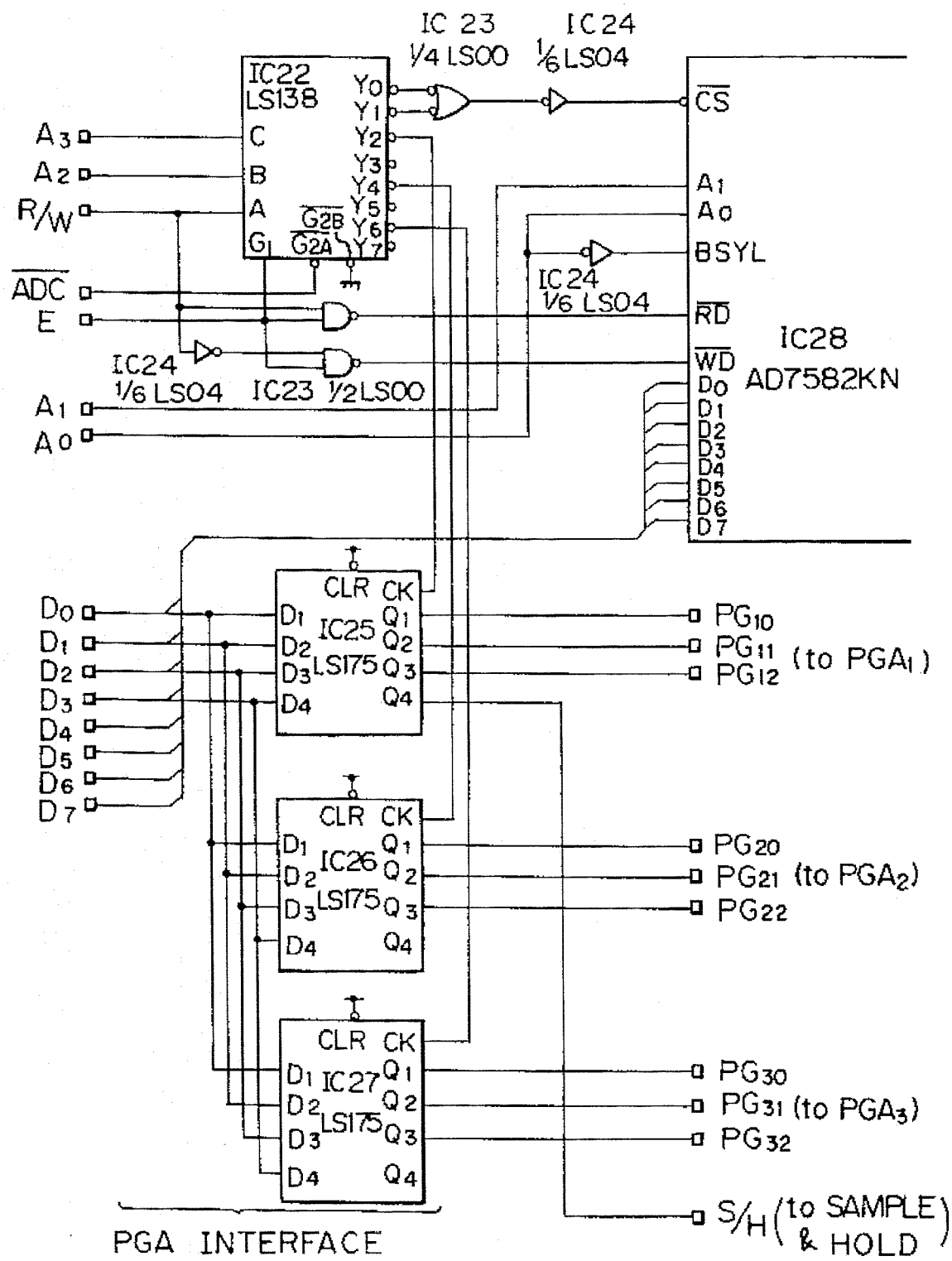
Figure 11E:
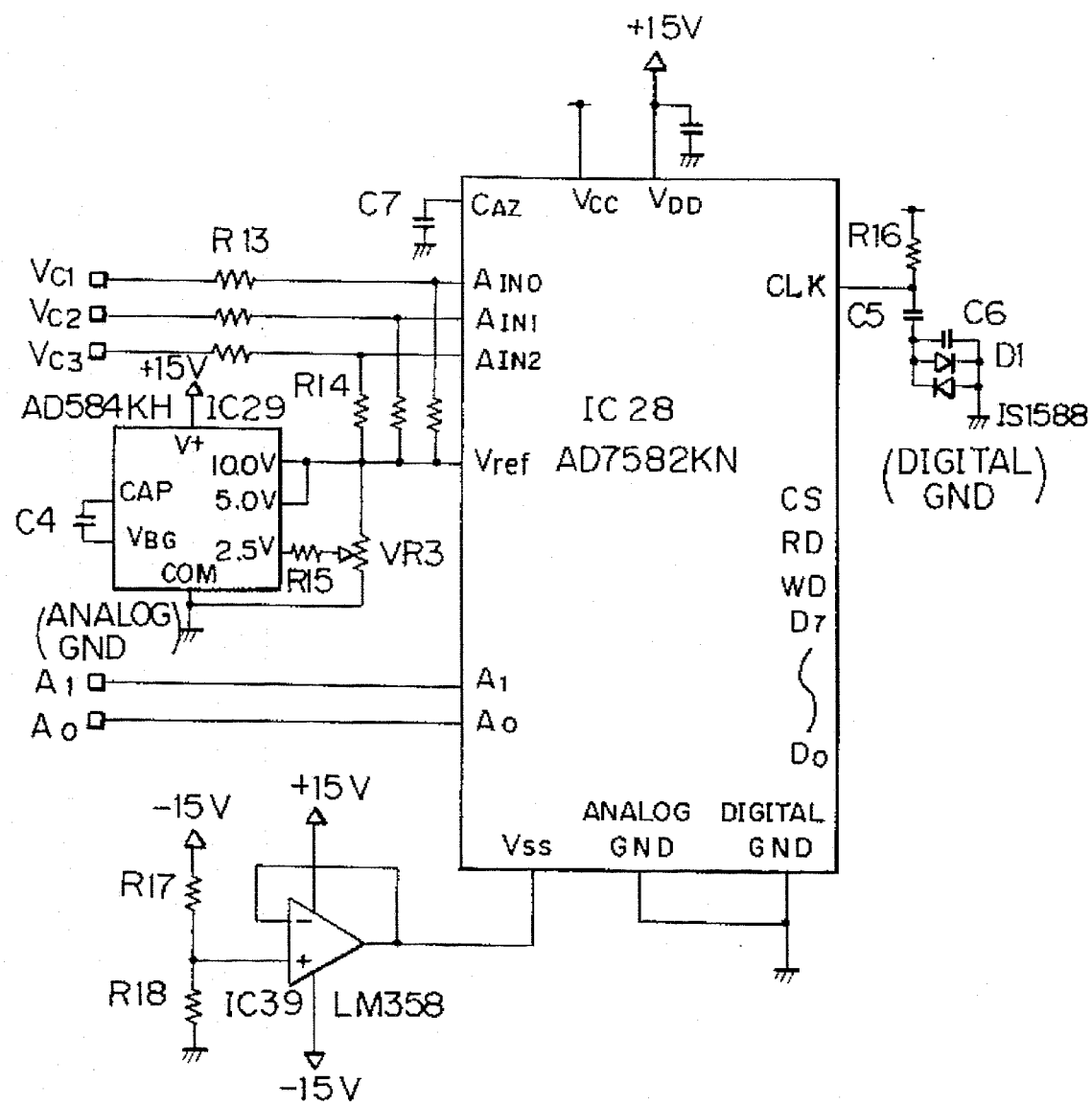

FIG. 11D is a digital portion of the A/D converter 12 and a peripheral circuit thereof including a PGA interface 46 shown in FIG. 10, and FIG. 11E is an analog portion of the A/D converter 12 shown in FIG. 10. The A/D converter 12 is formed by IC 28 (AD7582KN) and the PGA interface 46 is formed by IC 22, IC 25, IC 26, and IC 27.

Figure 11F:
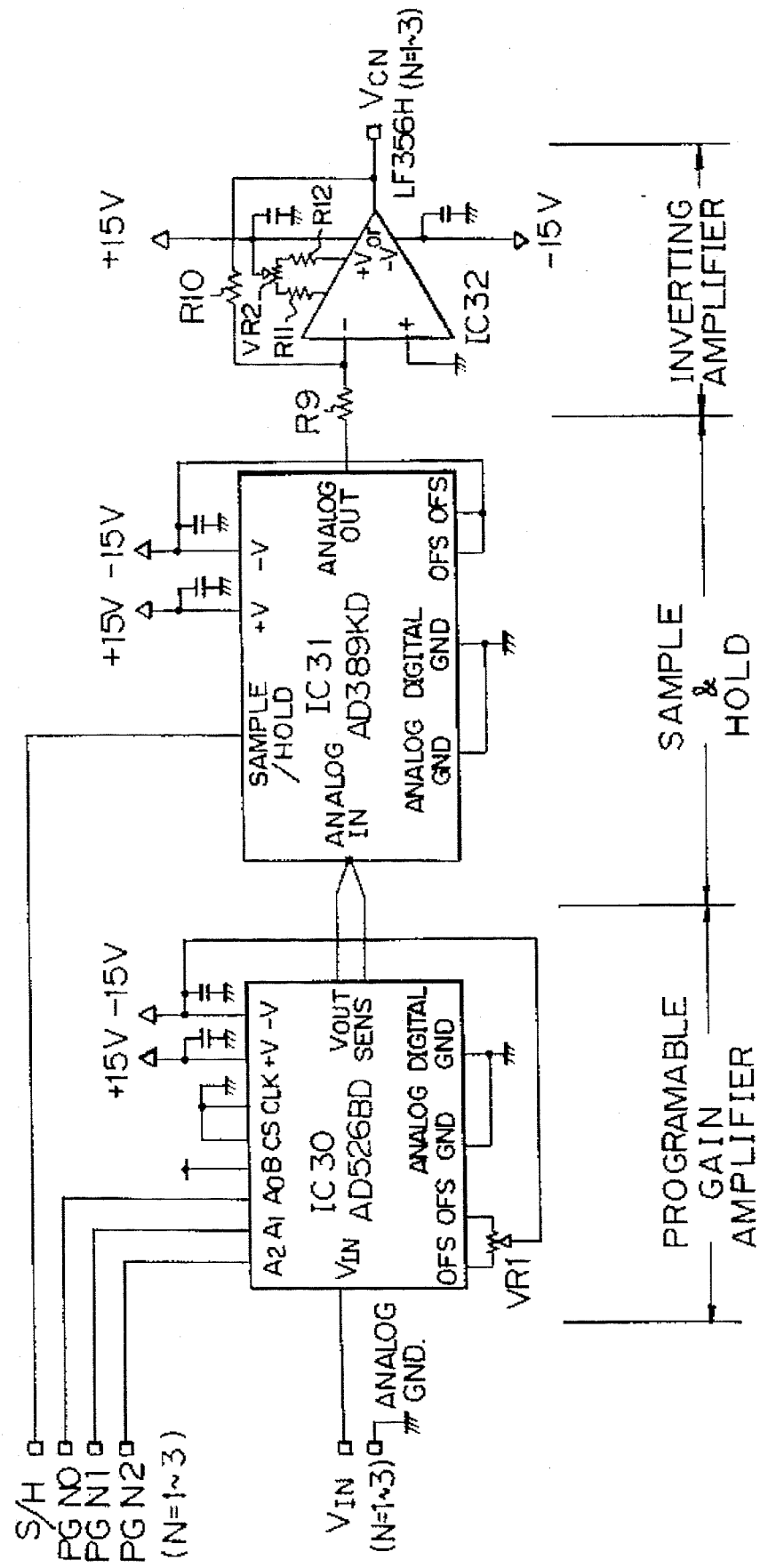

FIG. 11F is one of the variable or programmable gain amplifiers 18a~18c shown in FIG. 3, and is formed by a variable or programmable gain amplifier (IC 30, AD526BD), a sample and hold circuit (IC 31, AD389KD) and an inverter amplifier (IC 32, LF356H). The outputs of the programmable gain amplifiers 18a~18c are supplied to the analog portion of the AD converter IC 28.

Figure 11G:
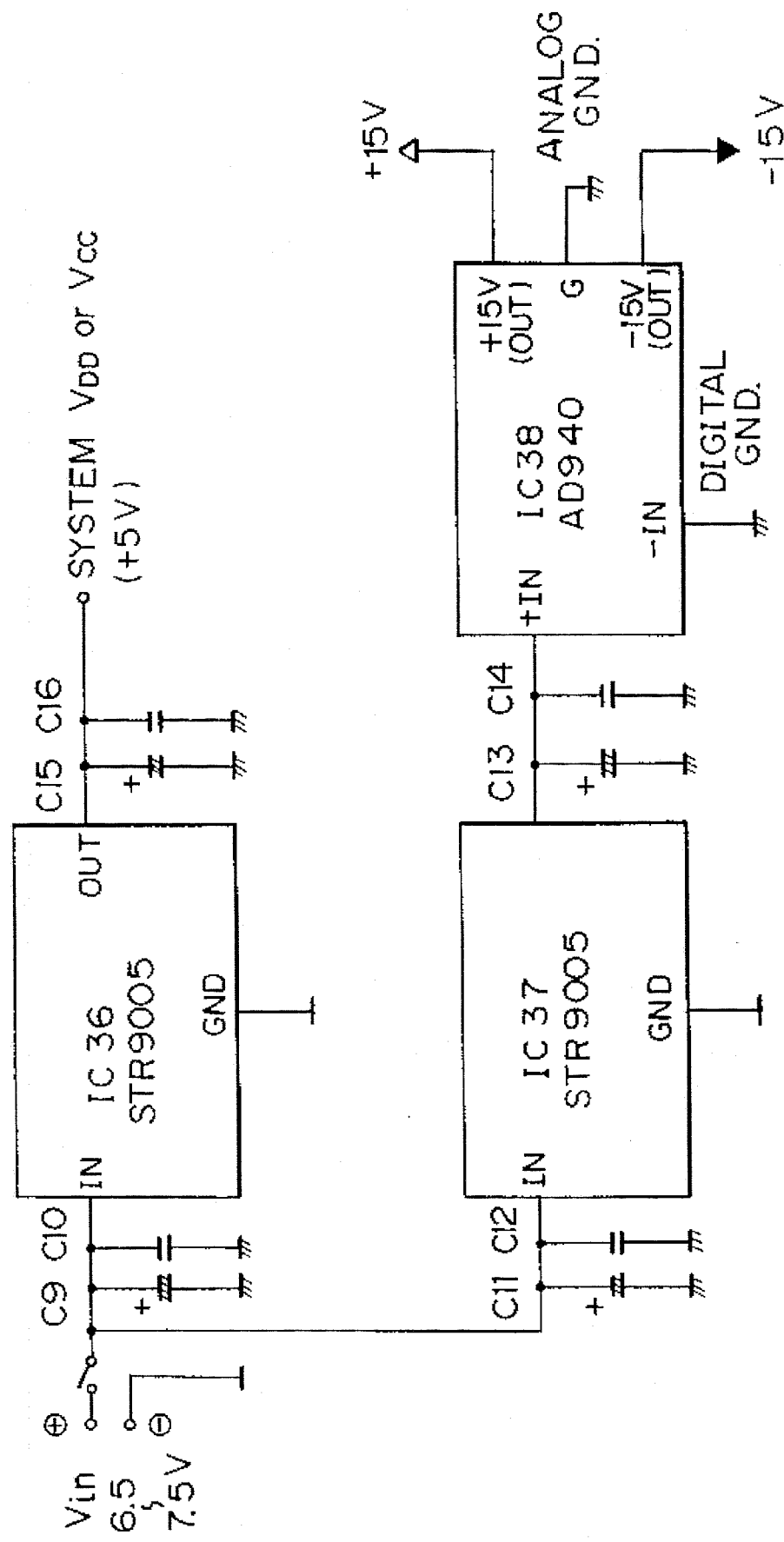

FIG. 11G is a power source circuit which is formed by power regulators IC 36, IC 37 and a DC—DC converter IC 38 (AD940).

Figure 11H:
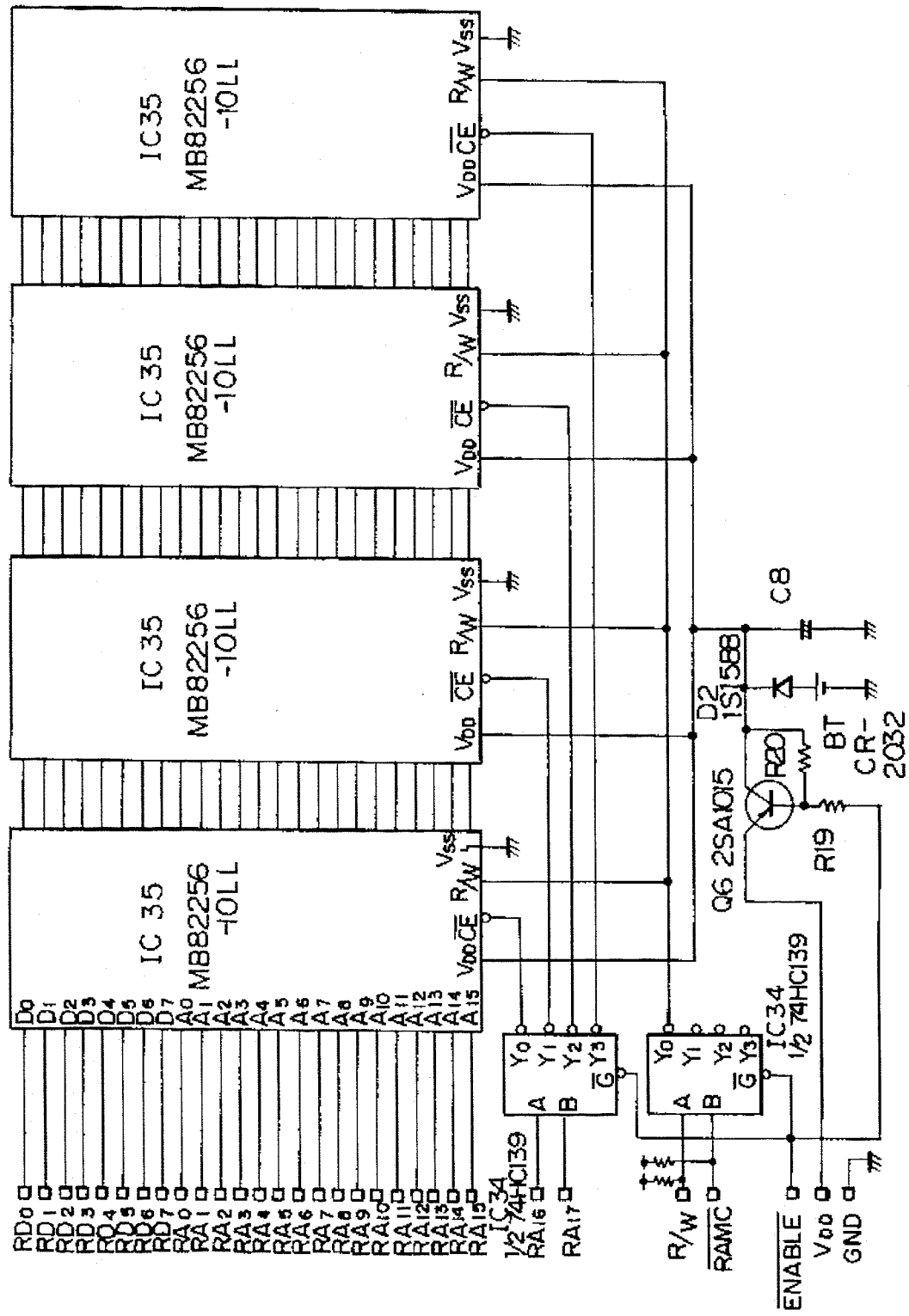

FIG. 11H is the memory cassette circuit 14 shown in FIG. 3 connected to the memory cassette interface shown in FIG. 11B via a memory cassette connector 19. The memory cassette circuit 14 is formed by four IC 35's (MB82256). The capacity of the memory cassette circuit 14 is 128K byte.

Figure 12A:
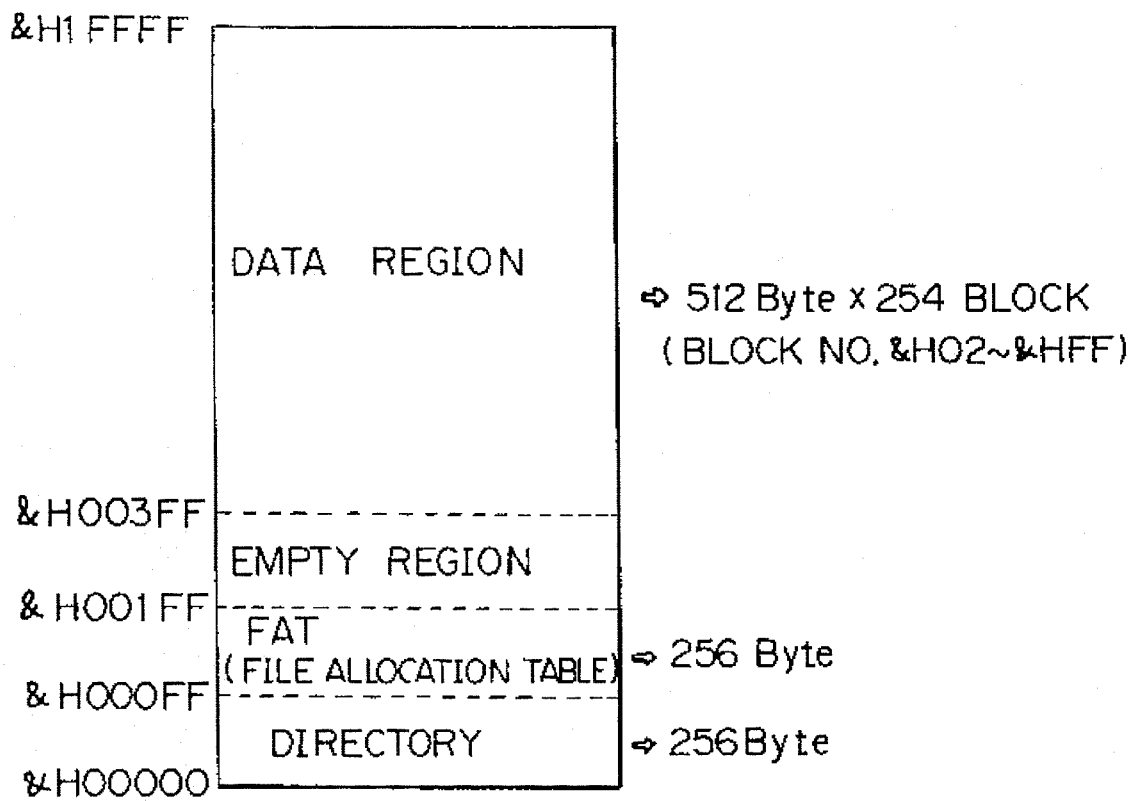
FIG. 12A is a memory map of the memory cassette shown in FIG. 10.

FIG. 12A is a memory map of one embodiment of a memory device according to the present invention. The management system of the data in the memory cassette will be explained hereinafter. In FIG. 12A, a directory is allocated at &H00002~&H000C7, which corresponds to file numbers 01~99. When the file number is assumed as F, a lead address of the FAT (File allocation table) is stored in the address (F×2) and a sampling time is stored in the address (F×2+1). When the data is not recorded in the file number, &H00 is allocated at (F×2).

A FAT is allocated at &H00102~&H001FF, and the lower two digits of the hexadecimal address correspond to block number &H02~&HFF. When the FAT is &H00, the data is not recorded in the corresponding block. When the data is recorded, the next FAT number is written. When the FAT is &H01, it means that the block is a final block.

The data region is divided into block number &H02~&HFF each having 512 bytes. In each block, the data is stored in the order of x, y, and z in accordance with a time sequence. As two bytes are required for one axis, one block of sampling data is formed by 2×3=6 bytes. Therefore, data of 512÷6=85 (85+2) is recorded for one block. The remaining two bytes are not yet used. When the block number is designated as B and an actual address is designated as AD, the relationship between the block number and the actual address is shown by AD=B×512. This means that the upper 8 bits of the actual address is the block number.

Figure 12B:
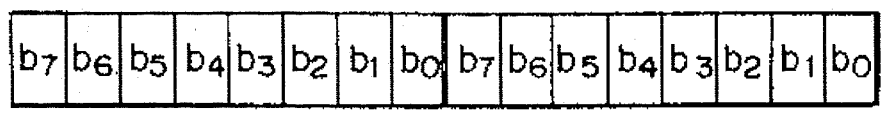
FIG. 12B shows a construction of one block of data in the map shown in FIG. 12A.

The constitution of one block of data is shown in FIG. 12B. The voltage signal may be calculated as "data/2048× scale factor".

Figure 13:
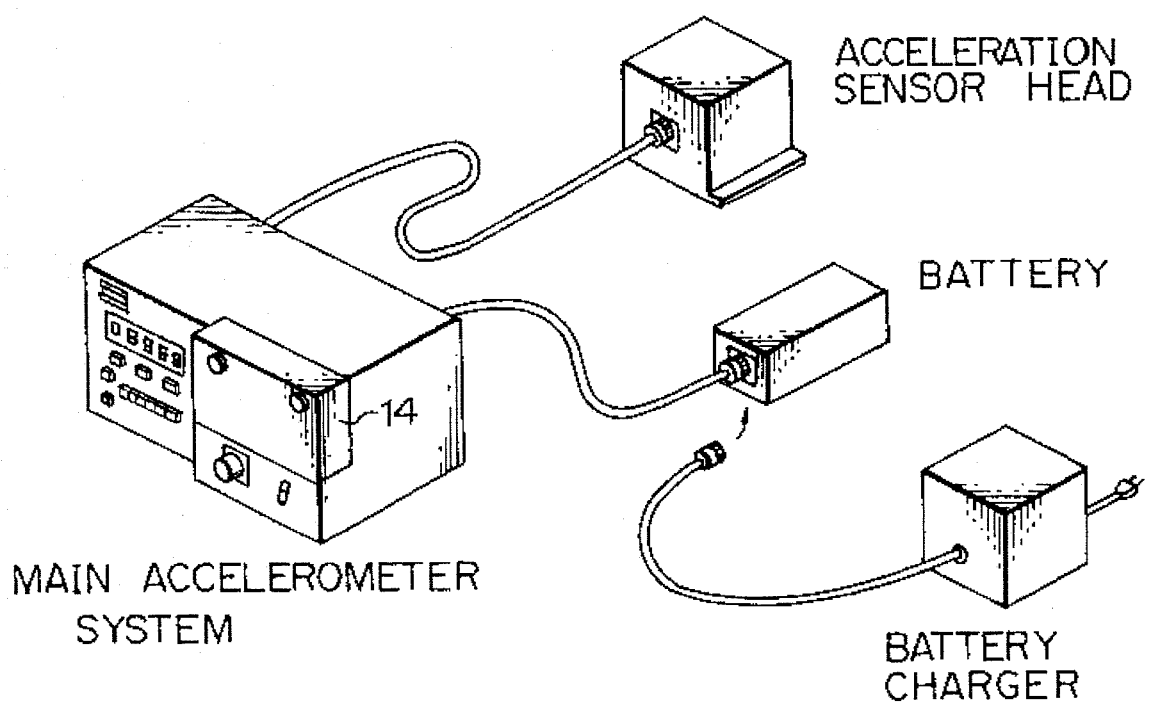
FIG. 13 shows a configuration of the accelerometer according to the present invention.

FIG. 13 is an accelerometer system according to the present invention wherein the reference numeral 14 is a memory cassette shown in FIG. 3.

Figure 14:
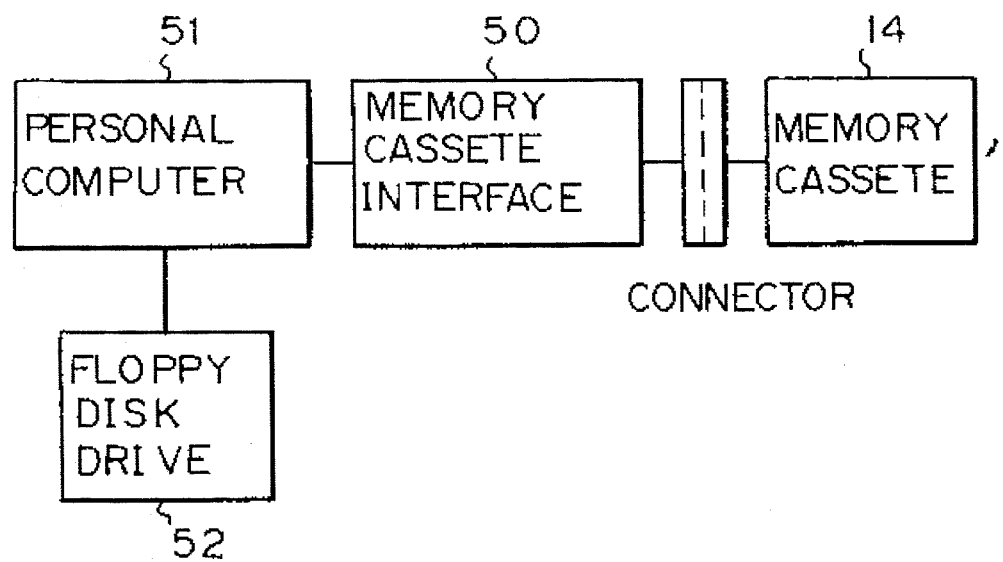
FIG. 14 is a block diagram of the apparatus which reads out the content of the memory cassette at a work station on the ground after completion of measurement.

FIG. 14 is a block diagram of the apparatus which reads the memory cassette at a work station on the ground. As shown in the block diagram of FIG. 14, the content of the memory cassette 14 is transferred via a memory cassette interface 50 to a personal computer 51. The transferred data is stored by a floppy disk drive 52 onto a floppy disk. At this time, the data is converted into a format which can be easily handled so as to be usable in another system for numeric analysis.

Figure 15:
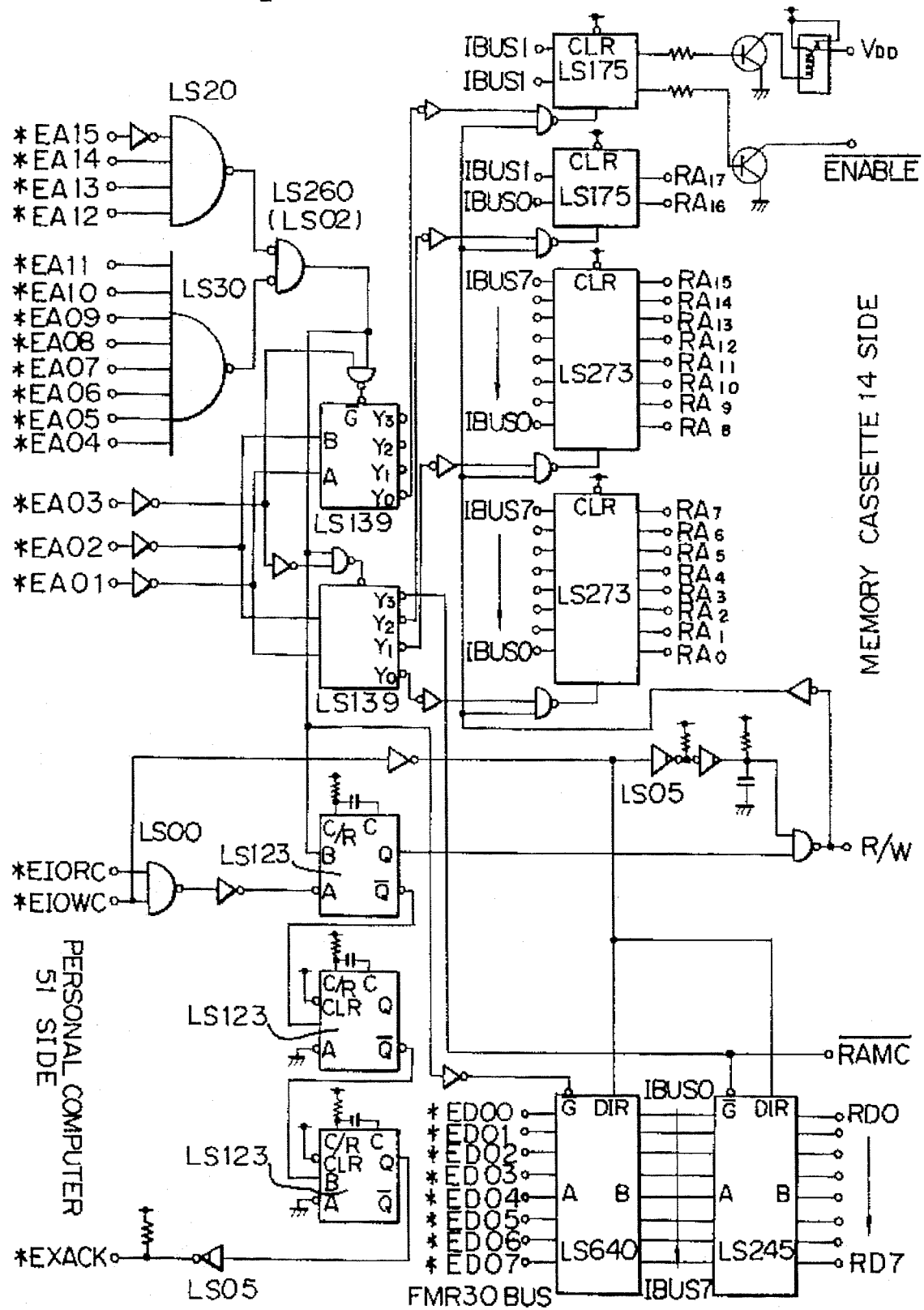
FIG. 15 is a detailed circuit diagram of the cassette interface shown in the block diagram of FIG. 14.

FIG. 15 is a detailed circuit diagram of the memory cassette interface shown in FIG. 14. In FIG. 15, LS273 and LS175 designate a latch for specifiying the address for write and read of the memory cassette, LS640, and LS245 designate a data bus transceiver for controlling the direction of the data in the interface between the personal computer and the data of the cassette data. Further, LS123 is a one shot multivibrator for controlling the timing of write and read, and LS20, LS30, and LS139 are address decoders for selecting the address of the personal computer.

As explained above, the present invention can measure the acceleration applied to the body at high rate of time interval and can be made small in size. Thus, acceleration changes in an experimental system which cannot be measured by the conventional apparatus can be easily measured in the present invention. According to the present invention, a high speed measurement and recording in less than 1/30 second is possible.

Further, according to the present invention, the correct connection of a memory cassette can be surely and simply detected. According to the present invention, the memory cassette used as the external memory element of a computer can be made small in size and light in weight so it is useful for miniaturization of an entire system. IN addition, since the correct connection of the memory cassette is detected, a high system reliability is achieved.

Figure 16:
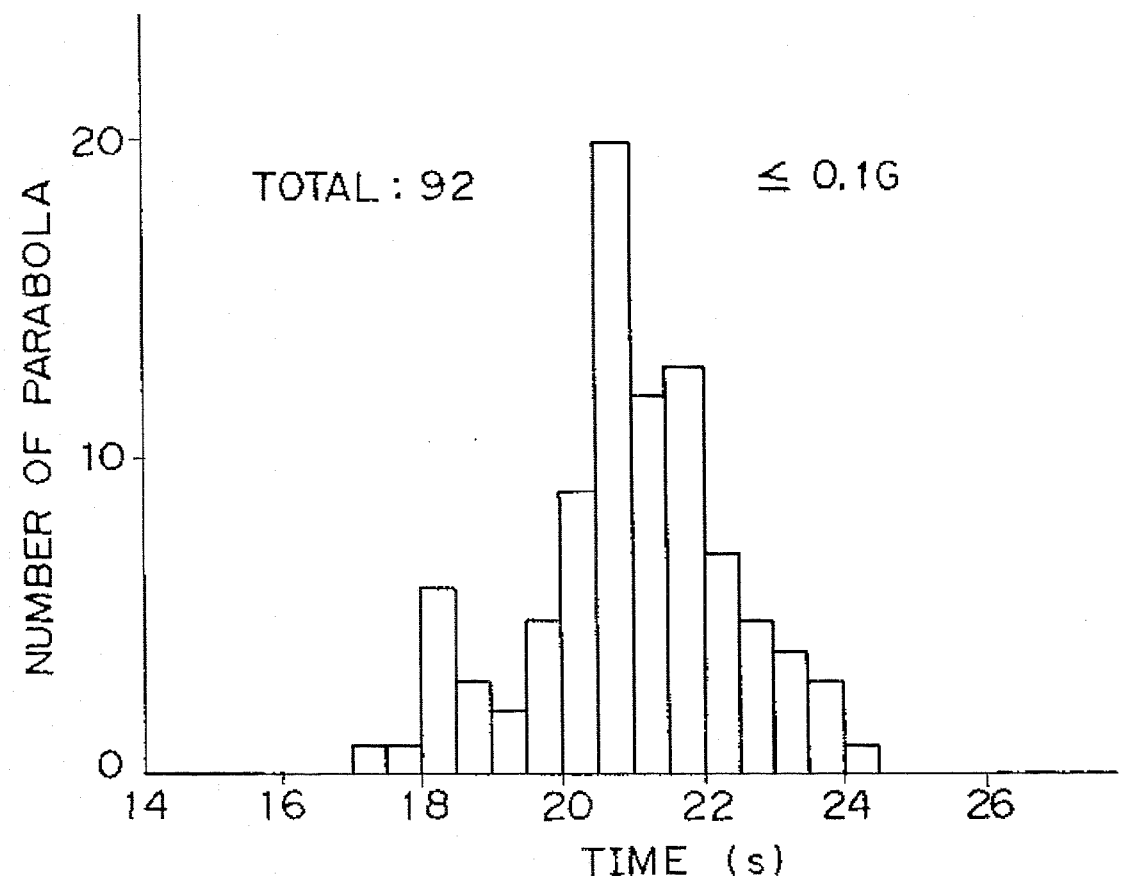
FIG. 16 is a graph of a distribution of time duration of reduced gravity.

FIG. 16 is a histogram in which the ordinate shows the distribution of the duration of reduced gravity when the acceleration in the Z direction is below 0.1 G in each flight trajectory, and the abscissa shows the time. From this, it can be seen that the duration of reduced gravity is distributed between a minimum of 18 seconds and a maximum of 24 seconds.

Figure 17:
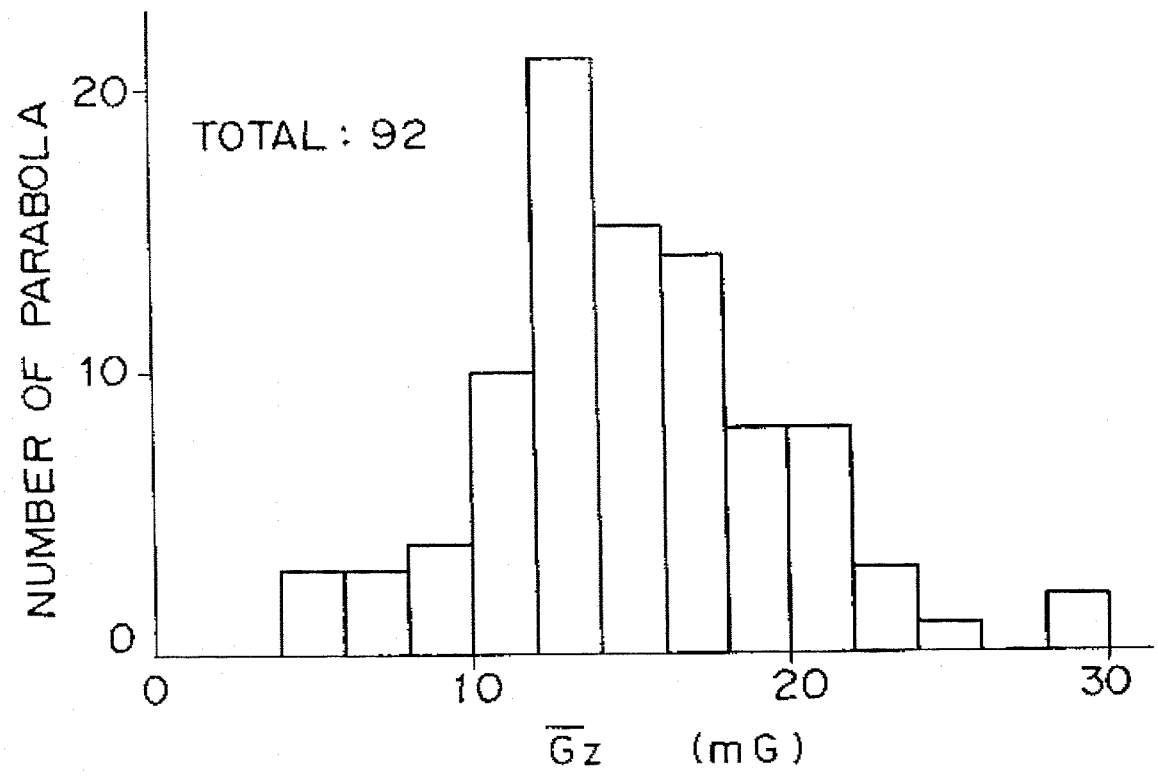
FIG. 17 is a graph of a distribution of mean reduced gravity.

FIG. 17 is a histogram in which the residual acceleration is shown as the abscissa. In FIG. 17, the data included before and after 1 second when the acceleration in the Z direction becomes below 0.1 G is omitted and the mean value of the data is obtained, so that the residual acceleration level in one flight trajectory is shown. FIG. 17 shows that the level of residual acceleration reaches a peak value at 12~14 mG.

Figure 18:
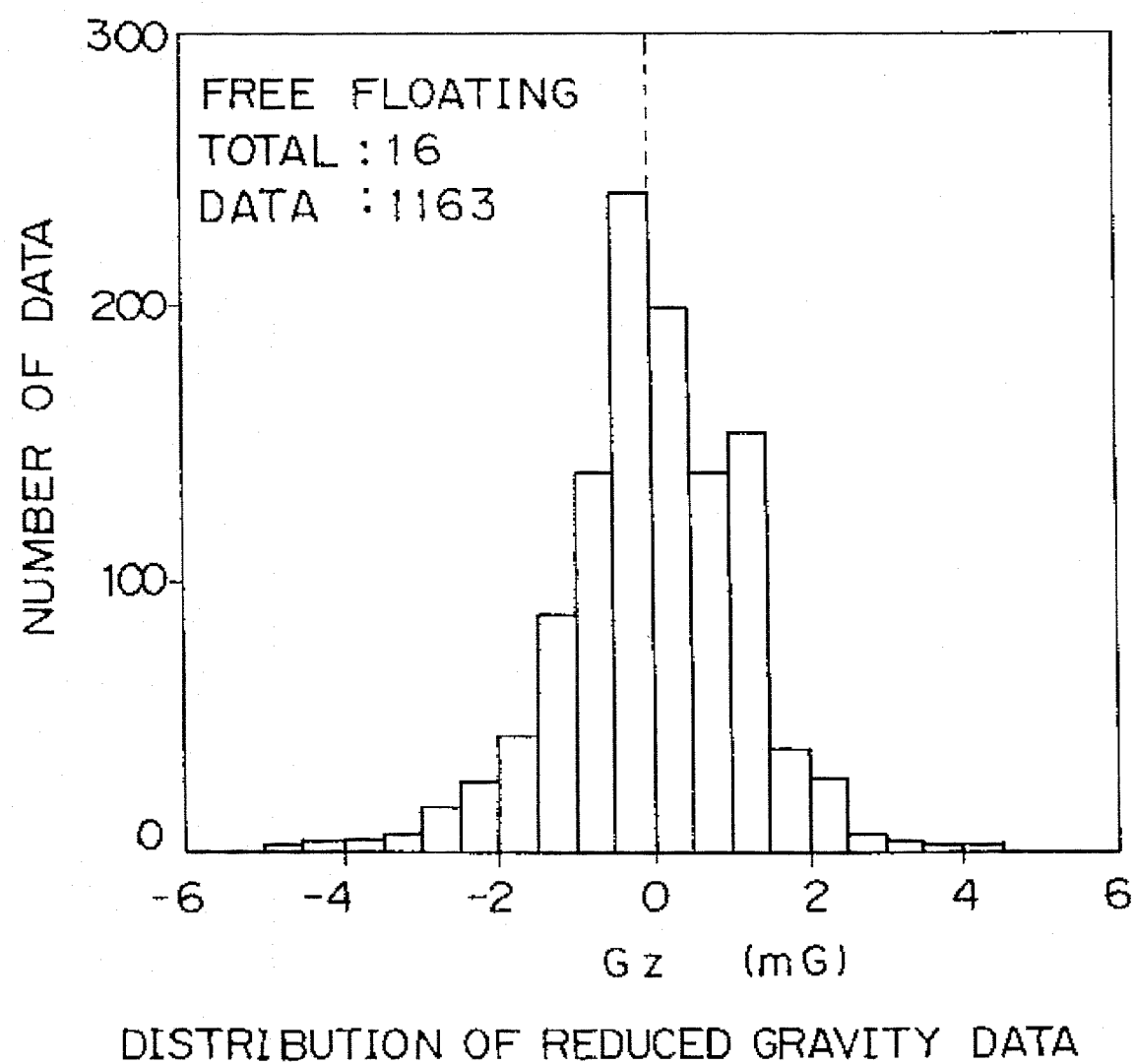
FIG. 18 is a graph of a distribution of reduced gravity data when the experimental device is free floating.

FIG. 18 is a histogram showing the distribution of reduced gravity data. When the experimental module is floated from the aircraft, the last time is rather short. The data shown in FIG. 18 is from obtained from 1163 groups of data when the residual acceleration goes below 5 mG. From FIG. 18, it can be seen that there is a variation of about 1 mG of normal deviation centered at approximately 0 G. Actually, the mean value thereof is −2 μG. That is, the acceleration circumference is considerably improved to a μG level.

FIG. 19 is a distribution of reduced gravity data obtained from 52086 groups of data in which the experimental module is fixed onto the aircraft.

As mentioned above, the distribution of the residual acceleration is examined with respect to the 1163 groups of data obtained when the residual acceleration is continuously below 5 mG. It is understood that the distribution of the residual acceleration deviates about 1 mG from the normal deviation centered at about 0 G (the mean value is approximately −2 μG). That is, the acceleration circumference becomes considerably enhanced to a μG level. This is clarified by comparing the residual acceleration data (52086) when the module is fixed onto the aircraft as shown in the black portion in FIG. 19.

Figure 20A:
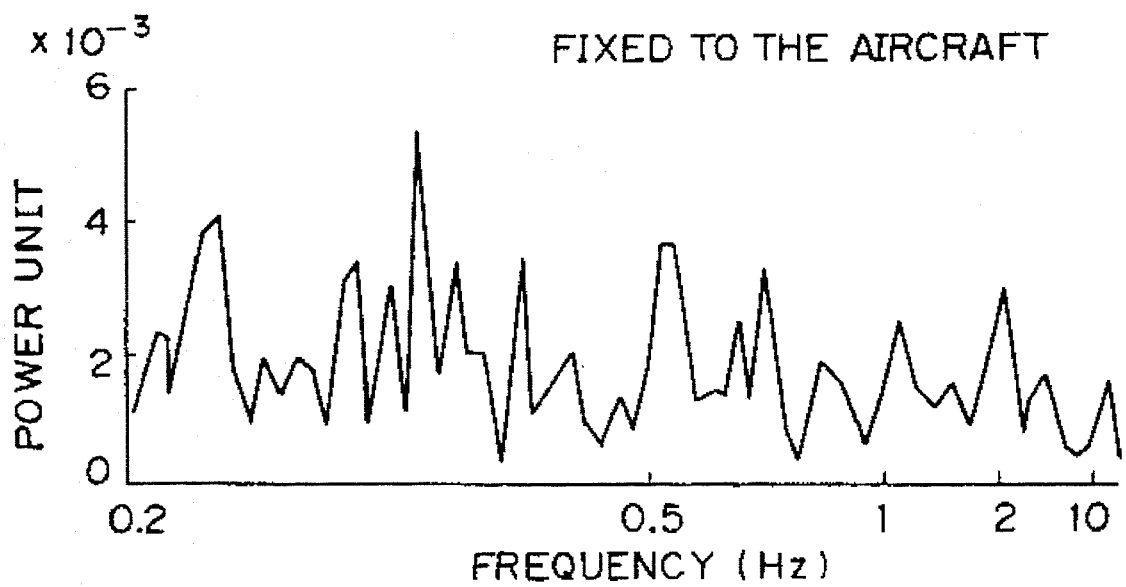
FIG. 20A is a graph of a power spectrum of gravity fluctuation when the module is fixed to the aircraft and FIG. 20B is a graph of a power spectrum of fluctuation when the module is free floating.
Figure 20B:
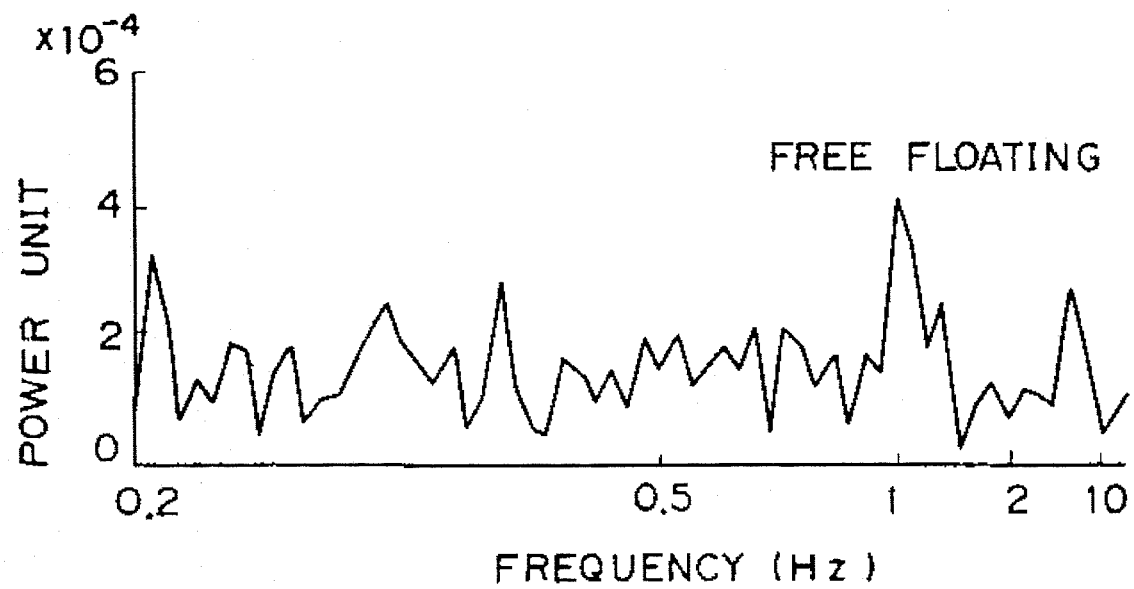

Actually, the measured acceleration data includes a few vibration components as shown in FIG. 4. Therefore, for the purpose of examining whether a specified frequency component exists in the vibration component, the vibration occurring in the zero gravity state is analyzed using the Fourier transformation method. This is shown in FIGS. 20A and 20B. No special frequency vibration component could be found using this analysis. It can be determined that the difference of one figure in the power of the vibration component occurs when the module is fixed to the aircraft (FIG. 20A) and when the module is free floating (FIG. 20B).

A compact 3-axis accelerometer system has been developed to measure acceleration during reduced gravity experiments carried out aboard the aircraft, KC-135.

The accelerometer system has the following features: 1) wide dynamic range; 2) compact and light-weight; 3) high reliability of data storage media against mechanical shock or vibration; and 4) low power consumption for a battery operating system.

Residual gravity during weightlessness varied with parabolas. A mean value of the residual gravity was 13±25 mG. The duration and interval of reduced gravity conditions were 21 s and 81 s, respectively. Free floating an apparatus for reduced gravity experiments with the accelerometer system within the KC-135 cabin greatly improved the residual gravity to 0.002±1 mG. In the conventional acceleration measuring apparatus, a magnetic tape or a floppy disk is used as a recording medium so that the device cannot be made small in size. There is also the possibility of undue wear when the device is subject to severe vibration. The mechanical vibration generated by the device itself will also have a detrimental effect on the experiment. It is also desirable to include the power within the device to make it portable so that it can be applied to a variety of experiments. Additionally, for the purpose of affecting experiments in space, measurement of not only a low gravity state, but also a transient increased gravity state, such as that produced by the thrust of a rocket being launched, needs to be measured so that the measurement range of the device needs to be suitably wide.

For the purpose of solving the above-mentioned problems, the following items are proposed:

(1) the apparatus is made small in size and light in weight (volume below 4000 cc, weight below 4 kg);

(2) no mechanical driving portion is included;

(3) the power is supplied by a battery; and (4) wide range measurement (10 G~10 µG). The above items can be achieved by the apparatus of the present invention as explained below.

Small size and light weight

A "memory cassette" in which a 256 K bit static RAM formed as a module is used as a memory medium. The memory cassette is made detachable by a connector from the main unit. The signal of the acceleration sensor is converted to a digital signal by an A/D converter and stored in the memory cassette as time sequential data. By using a memory cassette, the volume and the weight of the recording portion can be reduced to below 1/5 that of the conventional apparatus and a mechanical drive portion can be excluded. The data stored in the memory cassette is read out via an interface circuit by a computer after the experiment is finished, and the data is processed in a form such as a graph or various numerical operations.

Battery drive

A +5 V battery is required for a digital IC such as a microprocessor or a peripheral logic circuit. A ±15 V power supply is required for elements of an analog signal processing system such as the acceleration sensor or a high precision A/D converter. The +5 V is provided by a nickel cadmium battery module (7.2 V, 1200 mAh) as a stabilized electric power source, and the +15 V is provided by a DC—DC converter. As the analog signal processing system generate noise such as ripple a low noise DC—DC converter is selected. Using this system, a one-hour continuous operation becomes possible using only one battery module 130× 45×22 mm.

Wide range

A variable or programmable gain amplifier is placed between the acceleration sensor and the A/D converter, and is controlled by the microcomputer so as to always be set at an optimum amplification factor. Since the resolution of the A/D converter is 12 bits, a range of over 16 bits can be realized.

The apparatus of the present invention was used on the experimental apparatus on the floor of the NASA KC-135, the performance was tested and good results were obtained. Further, a three-axis acceleration measuring apparatus which is suitable for low gravity experiments and which is the smallest in the world was developed and two kinds of devices for use with normal aircraft and for use in space were developed. The functions of these two types of devices are shown in Table 1.

TABLE 1

| Items | for aircraft | for space |
| --- | --- | --- |
| Maximum measuring range | | ±10 G |
| Resolution | | ±10 µG |
| Sampling time | 10 | 100 ms |
| Memory capacity | 128 kB | 1 MB |

TABLE 1-continued

| Items | for aircraft | for space |
| --- | --- | --- |
| Battery capacity | 1200 mAh | 4000 mAh |
| Volume and weight | 3800 cm$^2$ | 3000 cm$^2$ |
| (control recording portion) | 3.0 kg | 3.5 kg |

By using the acceleration measuring apparatus of the present invention which is small in size and portable, unlike the prior art, for low gravity experiments, the acceleration of the experimental apparatus under low gravity conditions can be measured precisely.

The acceleration sensor block in the main system requires that the following conditions be met:

1) static acceleration changes can be detectable;

2) sufficient precision is obtained in the low gravity region; and 3) small size and light weight, and low power dissipation.

The present system uses a servo system type sensor which is the most suitable for these conditions. A ±1 G sensor is used for a main wing direction (X axis) and an advance direction (Y axis) of the aircraft, and a ±4 G sensor is used for a vertical direction (Z axis).

In the measuring and control portion, the signal from the sensor is amplified by a suitable factor, and after it is converted to a digital value by the A/D converter, it is transferred to a memory cassette. For carrying out this process, an 8 bit microprocessor is used, and the microprocessor carries out the following operations in accordance with a program stored in the ROM:

1. suitability of the sensor signal amplifier factor;

2. generation of the sampling signal;

3. management of the memory cassette; and 4. display of input commands and the operation situation.

The memory cassette is a recording medium using a semiconductor memory. The memory cassette now developed provides a capacity of 128 K bits in one cassette. Continuous measurement becomes possible for 210~2100 S at a sampling interval of 10 ms~100 ms. Further, during the aircraft measurement, if one experiment is completed in a comparatively short time, the measured data can be allocated to a plurality of variable length files so as to effectively use the memory capacity.

The small size apparatus for measuring and recording acceleration may be used for measuring and recording acceleration of a car or vehicle or pocket.

We claim:

1. A small size apparatus applied to a moving body for measuring and recording acceleration with time, comprising:

a servo-type acceleration sensor producing an analog signal;

a variable gain amplifier connected to said acceleration sensor to receive the analog signal and amplify the analog signal by a suitable factor;

a sample and hold circuit connected to said variable gain amplifier to sample and hold the amplified analog signal;

an A/D converter, having an analog portion and a digital portion, the analog portion being connected to said sample and hold circuit, for converting a sampled and held analog signal by the sample and hold circuit into a digital signal when the sample and hold circuit is actuated;

a control element, connected to said digital portion of the A/D converter, for processing the digital signal, said control element comprising:
    a central processing unit;
    a read only memory connected to said central processing unit;
    a random access memory connected to said central processing unit;
    a programmable timer connected to said central processing unit;
    a programmable gain amplifier interface connected to said central processing unit;
    a peripheral interface adapter connected to said central processing unit; and
    a memory cassette interface connected to said central processing unit;

a detachable external memory device, connectable to said control element, having no mechanical movement, for storing data regarding a change in acceleration as time sequential data;

an I/O unit operatively connected to said control element; and a battery for supplying electric power to said sensor, said A/D converter, said control means, said detachable external memory device, said variable gain amplifier and said sample and hold circuit, said central processing unit performing, in accordance with a program stored in said ROM, suitability of sensor signal amplification factor, generation of a sampling signal, management of said detachable external memory device, display of input commands and operation situation to said I/O unit, and controlling said variable gain amplifier to always be set to an optimum amplification factor, said small size apparatus being mounted on a moving body to be measured and the entire small size apparatus being driven by said battery.

2. An apparatus according to claim 1, wherein said detachable external memory device has a recording medium selected from one of a semiconductor memory, a bubble memory and similar memories having no mechanical movement.

3. An apparatus according to claim 2, wherein said detachable external memory device is formed by four 256k bit static RAMs, detachable from a main body via a multipole connector.

4. A small size apparatus according to claim 1, wherein said small size apparatus begins measuring and recording acceleration at the instant the acceleration changes from high to low and goes below a first predetermined value, and wherein said small size apparatus stops measuring and recording acceleration at the instant the acceleration changes from low to high and goes above a second predetermined value.

5. An apparatus according to claim 1, wherein a sampling time interval of a sampling signal for said sample and hold circuit is 10 ms~100 ms.

6. An apparatus according to claim 5, wherein the sampling time interval is less than $\frac{1}{30}$ second.

7. An apparatus according to claim 1, further comprising three acceleration sensors connected at right angles along three dimensional axes for measuring fine changes in acceleration with respect to time in three dimensional directions.

8. An apparatus according to claim 1, wherein said memory cassette interface comprises:
    a latch for specifying the address for writing or reading said detachable external memory device;
    a data bus transceiver for controlling the direction of the data in said memory cassette interface between a personal computer and the data of said detachable external memory device;
    a one-shot multivibrator for controlling the timing of the write and read operations; and
    address decoders for selecting an address of said personal computer.

9. An apparatus according to claim 1, wherein said acceleration measurement is between 10 G–10 μG.

10. An apparatus according to claim 1, further comprising a power source circuit, said power source circuit is formed by power regulators and a DC—DC converter.

11. An apparatus according to claim 10, wherein said power source circuit supplies +5 V for a digital IC, ±15 V for an analog signal processing system, +5 V is delivered by one of said power regulators and ±15 V is provided by said DC—DC converter.

12. An apparatus according to claim 1, wherein said gain control of said variable gain amplifier is determined by said central processing unit of said control element and automatically calculates the measured value for a full scale value.

13. An apparatus according to claim 1, wherein an analog output signal of said acceleration sensor is stored in said sample and hold circuit synchronized with the sampling signal.

14. An apparatus according to claim 1, wherein a sampling interval of a sampling signal for said sample and hold circuit and start and end points of the acceleration measurement are inputted by external switches.

15. An apparatus according to claim 1, wherein volume and weight of said apparatus is below 4000 cc and below 4 kg, respectively.

16. An apparatus according to claim 1, wherein the data recorded in said external memory device can be read out and processed by other apparatus after the experiment is completed.

17. An apparatus according to claim 1, wherein the measurement range of the X and Y axes acceleration sensors is ±1 G, and that of Z axis is ±4 G.

18. An apparatus according to claim 1, wherein the capacity of said detachable external memory device is 128k bits in one cassette, and continuous measurement becomes possible for 210–2100 sec. (3.5–35 min.) at a sampling interval of 10–100 ms.

19. An apparatus according to claim 1, wherein said detachable external memory device is a large capacity static or dynamic type Random Access Memory (RAM) backed up by battery.

20. An apparatus according to claim 1, wherein a sampling interval of a sampling signal for said sample and hold circuit and the start and end points of the acceleration measurement are automatically determined by a trigger obtained from the output signal from said acceleration sensor.

21. An apparatus according to claim 20, wherein the trigger obtained from the output signal from said acceleration sensor, changes in accordance with a trajectory or parabolic flight of an airplane.

22. An apparatus according to claim 21, wherein the trigger is obtained in accordance with, at a first instant, an acceleration in a Z direction (vertical) changes from high to low and goes below a first predetermine value, and, at a second instant, the acceleration changes from low to high and goes above a second predetermined value, and the apparatus begins measuring and recording acceleration at the first instant, and stops measuring and recording acceleration at the second instant.

23. A small size apparatus applied to a moving body for measuring and recording changes in acceleration in three axes with respect to time, comprising:

three acceleration sensors located at right angles along three dimensional axes for measuring fine time changes in X, Y and Z axis accelerations, respectively, each of the three acceleration sensors producing an analog signal corresponding to the X, Y and Z axis accelerations, respectively;

three variable gain amplifiers each connected to each of said three acceleration sensors respectively, to receive the analog signal from each of said acceleration sensors and to amplify each analog signal by a suitable factor, respectively;

three sample and hold circuits each connected to a respective one of said three variable gain amplifiers to sample and hold each of the amplified analog signals of each of the three variable gain amplifiers;

an A/D converter having an analog portion and a digital portion, the analog portion connected to each of said three sample and hold circuits, for converting sampled and held analog signals from each of said three sample and hold circuits, into digital signals, respectively, when each of said three sample and hold circuits are actuated;

a control element connected to said digital portion of said A/D converter, for processing the digital signal, said control element comprising:

- a random access memory connected to said central processing unit;
- a programmable timer connected to said central processing unit;
- a programmable gain amplifier interface connected to said central processing unit;
- a peripheral interface adapter connected to said central processing unit; and
- a memory cassette interface connected to said central processing unit;

a detachable external memory device having no mechanical movement, operatively connected to said control element, for storing data regarding changes in X, Y and Z axis accelerations as time sequential data;

an I/O unit connected to said control element; and a battery for supplying electric power to said sensors, said variable gain amplifier, said sample and hold circuit, said A/D converter, said control element, said detachable external memory device, and said I/O unit, said central processing unit performing, in accordance with a program stored in said ROM, suitability of a sensor signal amplification factor, generation of a sampling signal, management of said detachable external memory device, display of input commands and operation situations to said I/O unit, and controlling the variable gain amplifier to always be set at an optimum amplification factor, said apparatus being mounted on said moving body to be measured, and the entire small size apparatus being driven by said battery.

* * * * *